(12) United States Patent
Dulcetti Filho

(10) Patent No.: US 7,922,452 B2
(45) Date of Patent: Apr. 12, 2011

(54) EOLIC CONVERTER

(76) Inventor: Flavio Francisco Dulcetti Filho, Belém (BR)

( * ) Notice: Subject to any disclaimer, the term of this patent is extended or adjusted under 35 U.S.C. 154(b) by 156 days.

(21) Appl. No.: 12/071,595

(22) Filed: Feb. 22, 2008

(65) Prior Publication Data

US 2008/0203731 A1  Aug. 28, 2008

Related U.S. Application Data

(63) Continuation-in-part of application No. PCT/BR2006/000260, filed on Dec. 5, 2007.

(30) Foreign Application Priority Data

Dec. 5, 2005 (BR) .................................... 0505380
Nov. 28, 2006 (BR) .................................... 0605878

(51) Int. Cl.
*F03D 3/00* (2006.01)
*F03D 3/06* (2006.01)

(52) U.S. Cl. .......................................... 416/117; 290/55

(58) Field of Classification Search .................... 290/55; 416/117
See application file for complete search history.

(56) References Cited

U.S. PATENT DOCUMENTS

| | | | | |
|---|---|---|---|---|
| 4,113,408 A | * | 9/1978 | Wurtz et al. ................. | 416/17 |
| 4,134,710 A | * | 1/1979 | Atherton ..................... | 416/117 |
| 5,195,871 A | * | 3/1993 | Hsech-Pen .................. | 416/12 |
| 6,619,921 B1 | * | 9/2003 | Lindhorn ..................... | 416/117 |
| 2002/0187038 A1 | * | 12/2002 | Streetman ................... | 415/3.1 |
| 2008/0181777 A1 | * | 7/2008 | Bailey ......................... | 416/117 |
| 2009/0001730 A1 | * | 1/2009 | Kuo et al. ................... | 290/55 |

FOREIGN PATENT DOCUMENTS

| | | | |
|---|---|---|---|
| DE | 87 01 224 U1 | | 5/1987 |
| DE | 3702234 A | * | 8/1988 |
| DE | 4418092 A1 | * | 11/1995 |
| DE | 44 28 731 A1 | | 2/1996 |
| EP | 0 379 626 A1 | | 8/1990 |
| GB | 2051252 A | * | 1/1981 |
| GB | 2119025 A | * | 11/1983 |
| GB | 2202592 A | * | 9/1988 |
| WO | WO 9401675 A1 | * | 1/1994 |
| WO | WO 9634197 A1 | * | 10/1996 |
| WO | WO-03/014565 A1 | | 2/2003 |

* cited by examiner

*Primary Examiner* — Joseph Waks
(74) *Attorney, Agent, or Firm* — Birch, Stewart, Kolasch & Birch, LLP

(57) ABSTRACT

A windmill converting wind forces into rotational energy that can be used to drive a generator or other apparatus requiring rotational energy to work. The windmill includes panels for capturing the wind arranged around a vertically rotating shaft. The panels are able to move from a vertical position when receiving the force of the wind to a horizontal position when rotated to the upwind side of the rotation, thus minimizing their aerodynamic resistance. The panels can also be moved toward or away from the vertical shaft and the area of the panels can be changed so as to maintain a constant speed of rotation of the vertical shaft.

12 Claims, 21 Drawing Sheets

EOLIC CONVERTER

RELATED APPLICATION INFORMATION

This application is a Continuation-In-Part of International Application PCT/BR2006/000260, filed Dec. 5, 2007 and claims priority to said International Application under 35 USC §120. The present application also claims priority through said International Application under 35 USC §119 (a-d) of Brazilian Application No. PI0505380-3 filed Dec. 5, 2005 and PI0605878-7 filed Nov. 28, 2006. The contents of each of the above applications are incorporated in their entirety by reference.

FIELD OF INVENTION

The present invention is applied to the electric power generation through the transformation of wind force into mechanical energy in a controlled way, powering equipment for electric or hydraulic power generation, as well as to rotors in general, with regulated power output supplying stable power independently of the wind speed.

BACKGROUND ART

Traditional windmills comprise propellers that rotate in the vertical sense in parallel to the equipment sustaining post, and are directly connected to the generator shaft or comprise shells that rotate in the horizontal sense perpendicularly to the post, connected to a vertical shaft.

In the case of propellers, they rotate as a function of a component (fraction) of the force of the wind that provides a rotation in the sense perpendicular to the wind direction. The propellers' aerodynamic surfaces take advantage of only a component of the wind force, and they possess extremely small area if compared to the circle described by their movement.

Propellers were developed basically to produce displacement of a mass of air, in other words to move the wind, and not to be moved by the wind, and so they are of low efficiency.

It being known that the wind acts to produce a force proportional to an area; if the area of wind reception is larger the "lifting" force of the wind will be larger. According to the conception of propellers, they possess little aerodynamic surface for wind reception, which is worsened by the impossibility in using several propellers in the same axis, due to aerodynamic interactions and the great structural limitation that the 7 propellers are singly supported on the spinner. This support will be supporting the weight of the propeller and also the wind load reaction. For example, a propeller with only 37 meters (circle radius) and weighing 7 tons approximately and also loaded with 1.47 tons from the wind, will produce a reaction at the junction of the propeller with the spinner of 8.47 tons, which is a limiting factor for the expansion of the wind reception area and it is decisive for the high cost of production of this system that is reflected directly in the calculations of competitiveness of wind energy.

In embodiments comprising shells, the problem is more serious, because they possess the same aerodynamic surface on their front part and their back, only with different resistance coefficients, resulting in an extremely small rotational force that reduces even more the efficiency of this method of wind force reception.

Another technical problem with the converters of the state of the art is the fact that the generated rotation is directly proportional with the speed of the incident wind, without the possibility of effective control of the rotation of the propeller shaft.

So, the power generated by generators moved by these converters oscillates, which is not desirable for generation of energy for consumption on a large scale.

The state of the art also includes converters endowed with blades or panels fixed to a horizontal shaft that rotate on a vertical axis, as in the document DE8701224. These panels are fixed to the horizontal shaft so that the panel is divided in two parts, a part above the shaft and another below, with different dimensions. When the wind beats on the front of the panel, the panel is in the vertical position, rotating the main shaft. When the panel arrives in the position that the wind beats in its back, the panel rotates to be in the horizontal position in a way that it does not have resistance to the wind ("feathering"). However, this mechanism is ineffective, because when the panel is with its back to the wind to be moved to the horizontal position, the part of the panel that is above of the horizontal shaft resists the feathering movement by the force of the wind, it being necessary to have an equal panel area below the horizontal shaft for the resultant force to be still zero kilograms and another part of the area will be used to combat the weight and drag in a way to permit the feathering movement. That is, in this embodiment, all the area that uses the wind pressure that beats on the inactive panel to feather it corresponds to an equal area lost to push the traction panel on the active side. A similar situation occurs to move the panel out of the horizontal position, which will reduce the return time to the vertical position, creating a new loss in relation to the total angular use of the traction side (180°) of the wind force.

As the panels are mechanically linked by the same shaft, arranged at 90° degrees and the wind is not always even due to bursts or turbulences, this link between the panels will increase even more the lifting wind force lost because the effort to move one panel can be added to an asymmetrical wind load from the opposite side by the other panel.

Such presented problems reduce considerably the conversion of the wind force into rotational force on the main vertical shaft, with the result that transformation into rotational energy is very small if one compares the total area for lift with the areas that offer resistance to the feathering and unfeathering, and this system performs inferiorly to propellers. One estimates that only 30% of the lift obtained by the traction panel is used. Furthermore, this embodiment has the same limitations on expansion of the wind reception area for generation of energy on large scale, due to the fact of the panels horizontal shaft is singly supported in the vertical axis, with the attending structural problems, functional problems and high costs for the size (length) of the panels to reach significant dimensions, as in the propeller embodiments.

The solutions of this state of the art try to compensate such problem making the panels with materials of different weight above the horizontal shaft and below the horizontal shaft, so that the upper part of the panel is heavier than the lower part. However, that is irrelevant in relation to the aerodynamic factors where the wind opposes the panel movement.

Also, this system does not foresee rotation control, it is not equipped with means for the movement of a panel toward the main shaft or away from it, it does not foresee a system for varying the panel area to compensate for wind speed variation, it does not foresee a brake to stop the system for maintenance, it does not allow feathering the panels in case of a windstorm, it does not present the support structural part of the rotary mast linked to the panels, and this embodiment is limited by having only two planes of panels interlinked with each other at a 90 degree angle.

In relation to the system presented in the document WO2003/014565 one finds practically the same limitations of the document DE8701224, the difference in these embodiments just being the relationship to the positioning of the horizontal shaft.

However, the embodiment of WO2003/014565 also has its horizontal shaft singly supported and so does not allow the use of this system for the generation of energy on large scale, and this embodiment starts to have a big loss in the useful lift due the effort for feathering in function of the weight; not so only by the wind action, but also in function of the structural shape of the panel, because such panel in accordance with the drawing will resist the wind aerodynamic pressures even if constructed using light materials such as aluminum, carbon fiber, etc., it will possess significant weight per square meter of surface compared to the wind lift produced per square meter.

So, the system of WO2003/014565 as described does not counterbalance the necessary wind pressure for the feathering and will reduce significantly the lift resulting, mainly due to resistance to the wind flow.

As the panels are mechanically interlinked on the same shaft by 90 degrees, and the wind is not usually even due to bursts or turbulences, this interdependence among the panels will increase still more the lift losses because the effort to move a panel can be added to an asymmetric wind load on the side opposed by the other panel, which is worsened as shown in the drawings and the description, by the angle of 90° formed (between the lifting traction panel (active side) and the inactive side) through the interdependence shaft that rotates together with the panels, in such a way that the horizontal panel is totally flat, and without any decline angle (that would provide exit from horizontal position and free from aerodynamic cost) that results in the formation of a mattress of air that produces great air resistance for that panel to leave from the horizontal position to the vertical position of traction.

Such problems reduce the use of the wind force considerably for the transformation into rotational force to the main vertical shaft, whose resultant force is very small if one compares the load for lifting with the weight of the areas that offer resistance for the horizontal and vertical positioning of the panels, added to the aerodynamic drag mentioned. So, this system possesses inferior performance compared with propellers, one estimates only 30% of the traction panel lift is used due to loss with the horizontal and vertical positioning of the panels. Furthermore, this embodiment has the same limitations as propellers or panels in the structural and functional point of view for energy generation on large scale, due to the fact of the horizontal shaft of these panels is singly supported to the vertical shaft through bearings, resulting in limitation for the size (length) of the panels to reach significant dimensions. Furthermore, the production of a singly supported panel with this configuration would have high production cost similarly as for a propeller.

This system does not foresee rotation control, it is not equipped with means for movement of the panels toward or away from the vertical shaft, it does not foresee a system of variation of the area of the panels to compensate for wind speed variation, it does not foresee any brake to stop the system for maintenance, it does not allow any means to put the panels in a horizontal position in case of a windstorm, it does not present the structural part of a rotating mast support linked to the panels, and this system is limited to only two planes of panels interlinked at 90 degrees.

EP0379626A1 describes an embodiment having a form of reception of the force of the winds that presents several limitations to good performance between the lift produced on the side that the wind pushes (producing traction) and the inactive side.

The system is composed of panels formed by several interdependent foils, arranged like slats of venetian blinds, that move through 90° between the active side (in front of the wind to produce lift) and the inactive side (back).

The foils of a same quadrant move simultaneously because they are interlinked through a belt. This belt transmits the rotating movement to put the slats in a horizontal or vertical position that arranges the slats through a mechanical command, that, as shown in the drawings, uses the rotation of the system (through gears, bearings, arms, etc) to make simultaneously (on the active and inactive side) the movement to the horizontal and vertical positions of the slats that compose each panel. The foils move through a complete course each ½ rotating cycle of 180°, in way to mechanically determine the horizontal or vertical position of the foils in a mode synchronized with the rotation of the group.

In the embodiment of EP0379626A1, the feathering movement is not determined directly by the direction or pressure of the wind, because the wind that acts on the aerodynamic panels does not have the vertical positioning function or horizontal positioning function in the system.

To compensate such problem in the way of the system to put the foils in the vertical position and to put the foils in the horizontal position in function of the direction of the wind (because otherwise it would not work) the illustrations show a small rudder that when being rotated by the wind modifies the mechanical parameters to try to synchronize the direction of the wind with the correct moment for the movement of the slats between the vertical and horizontal positions.

The rudder presented in the figures will only be capable to redirect the mechanical command for the movement of the foils in a way to compensate changes in the direction of the wind in extremely small systems. In other words, this system would not work for power generation on a large scale. Observe that a system with propellers seventy meters in diameter provides an approximate load of 23 tons owing to the weight of the propellers and wind loading, and to reposition such load when the wind changes direction, a powerful electric or hydraulic motor, and never a rudder as shown in EP0379626A1, is needed to change the instant to put the foils in the horizontal and vertical positions in relation to the change of the direction of the wind.

The system of the embodiment of EP0379626A1 also presents the same deficiencies already described in the documents DE8701224 and WO2003/014565 regarding the interdependence among the slats with an angle of 90°, (without declination angle) and aerodynamic costs, the weight of the foils that do not possess counter-balances, and all of these worsened by the attrition and weight of the mechanical system for feathering, and by any inefficiency caused by misalignment of the wind direction and the timing of the mechanically commanded feathering. In addition this system does not foresee rotation control, it is not equipped with means for movement of the panels toward or away from the main vertical shaft, it does not foresee a system to vary the area of the panels to compensate for alteration of the wind speed, it does not foresee any brake to stop the system for maintenance, it does not allow feathering in case of a windstorm, and it can be estimated that, in comparison with a shells system, it acts with a benefit of around 18% in the traction force produced by the wind for transformation into rotational mechanical energy.

The solutions of this state of the art try to compensate such problem making the foils with materials of different weight, so that the top part of the foil is lighter than the lower part. However, as a result, when the panel has to be in the horizontal position, the lower part being heavier demands a wind with larger force to maintain it in the horizontal position and even altering the weight of the lower and upper parts of the foils the problem becomes worse. Therefore this hinders still more the feathering of the foils, since what determines the horizontal position are the resultants of the wind against and in favor of the horizontal positioning movement.

Another technical problem of this system for generation of energy on a wide scale arises from the lack of a control that moves the panels toward or away from the main rotation axis to effectively control the rotation to compensate for variation in the wind speed.

BRIEF SUMMARY OF THE INVENTION

Based on the state of the art problems mentioned above, a windmill was invented to impel a system of electric power generation by the wind force. Small, intermediate and large scale versions are described. This system for its conception allows great expansion of the area of wind force capture on a single tower, having a structural design that allows almost limitless enlargement of the aerodynamic panels for capture of the wind force, with low construction cost if compared with the current standards used for generation of wind energy; which will provide obtaining energy with low production cost, turning wind competitive and still with smaller cost than the conventional ways today used for power generation such as hydroelectric, thermoelectric, nuclear etc. The system of the present invention transforms about 90 to 98% of the wind force into rotational mechanical energy, varying this percentage with the wind speed. In addition to this high efficiency, there is the possibility to amplify in several levels of panels without limit for the size of the referred panels, which provides for the use of gigantic areas of wind reception to rotate the same shaft, allowing the use of this system at low wind speeds. In embodiments of larger loads, a control to provide controlled and regulated power output, free from variations, oscillations and noises, as is usual on large scale or in places where the wind is insufficient for some periods, the wind system generator may be joined to a combustion engine with controlled injection, or in places that it already has offer of energy an electric engine will be joined instead of the combustion engine. This electric engine will always be rotating in the same shaft as the wind energy generator, in a way to avoid the energy consumption with the start of this engine, and when the system must compensate the failure of the rotation produced by the wind the electric engine will assume the propulsion of the generator in a way imperceptible to the consumer without any cut or oscillation in the energy, providing a hybrid system.

The present system does not need to be directed to the direction of the wind, because it obtains traction in any direction of the wind force, always rotating in the sense in that it was programmed to rotate. In addition this system also presents a safety device against strong winds and storms, by energizing coils located in upper stoppers of the panels' horizontal position, that will maintain all of the panels in a horizontal position by electromagnetic force.

The technique used for reception of the wind force provides rotation about a vertical axis, caused by the wind force when the wind beats on the front face of planar aerodynamic panels, which rotate in the horizontal sense describing circles. The aerodynamic surfaces do not use a format of shells or propellers They are constituted by panels with a planar surface with square or rectangular shape, that are thin and made with extremely light material that is resistant against the wind pressure, or if made of heavier materials, there are used in this case counterbalances mounted on the panels so that the relative weight to put the panels in the horizontal position continues to be small, resulting in low losses from feathering.

The rotary system possesses two different sides in relation to the wind direction; a traction side where the panels receive the wind on their front, and they are in the vertical position supported by a stopper, and provide lift to rotate about the vertical shaft; and an inactive side in which the panels are put into a horizontal position ("feathered") through the wind force so as to produce a smallest possible resistance to the wind against the rotation sense to maximize use of the lift obtained on the traction side. The result from this force to rotate the vertical axis will be the lifting force obtained on the traction side less the loss of that force to put the panels in the horizontal position, which is considered as the efficiency of the traction panels. A small additional loss exists from the aerodynamic drag of the horizontal panels that varies among 1% to 3% depending on the dimensions of the aerodynamic panels.

The rotation sense of the system can be clockwise or counterclockwise depending on which side (left or right) the stopper is positioned to maintain the panel in the vertical position when the front of the panel faces the wind direction and in horizontal position when the back of the panel faces the wind direction. When the panel has the stopper positioned to be in the vertical position on the left side in relation to the rotative mast the system will rotate in the clockwise sense and when set on the right side it will rotate in the counterclockwise sense.

The panels for wind capture are supported by a horizontal structure that is connected to and rotates with the main mast through hinges or another device that allows the panels to move in a quarter circle movement, where the hinges are fixed in the top part of the panels and in a fixed horizontal shaft (for small scale systems), or coupled to a servo-motor (for middle or large scale systems), providing the possibility to move the aerodynamic panels away from or closer to the vertical main shaft in a symmetric manner to control rotation in relation to variations of the wind speed. This system allows the aerodynamic panels to be positioned along the horizontal axis for several hinges in several points, providing the possibility to amplify the area of these panels without structural limits and at a manufacturing low cost, differently from the systems where the wind capture area is singly supported, and at lower production cost. When receiving the wind force on their front part, the panels stay in the vertical position producing traction and when receiving the wind on their back part the panels tilt up, being in the almost horizontal position (with small decline), resulting in a minimum aerodynamic resistance. In this system the panels use 100% of the force of the winds for traction or to feather the panels, depending on their position in relation to the wind sense and not having any interdependence axis between the traction and inactive panels that can cause aerodynamic resistance produced by bursts, turbulences, or asymmetry of the wind force, providing a high efficiency of use of the wind force in this embodiment for the transformation into rotational mechanical energy that depends exclusively on a minimum consumption of the wind force to move the panels to the horizontal position. Such high efficiency can be obtained using light or heavy materials, in the latter instance using panels comprising a counterbalance system.

Furthermore, this embodiment of wind force capture takes advantage of all of the horizontal effects of possible fast variations of the wind sense, as bursts or turbulences, etc, by not needing any setting type or repositioning upon variation in the wind direction.

The rotational horizontal group is installed on a vertical structural tubular post (small scale system) or vertical structure for the support of the rotative tubular system (large scale system that can be composed by several modules interlinked), which can contain several groups of horizontally supported aerodynamic panels disposed along the vertical rotational axis in variable angles and in several vertical levels to increase the final power output, which increasing of the number of groups by adding structures and increasing the size of the aerodynamic surfaces of the panels will depend on the desired energy capacity of the system.

The rotational vertical axis is fixed by bearings or slippery materials on a supporting structural post. Steel or concrete structures can optionally be used to make a cylindrical vertical hollow cover or rotary shaft fixed to the ground. In the external rotational vertical shaft (cover) to which the aerodynamic structures are fixed, which system rests on bearings and pads fastened to a supporting structural post that can be fixed to the ground or to an elevated structure to catch less turbulent wind layers. The supporting system has at the bottom end a gear or pulley system that is coupled to an electric power generator or other desirable rotational equipment.

The diameter of the gears and/or pulleys with bigger and smaller size will be responsible by the multiplication factor of the number of rotations of the shaft, and they will depend on the specifications and needs of the manufacturers of the generator that is to be adopted, in a way to obtain the correct relationship with the desired rotation medium.

For the generation of more power and to better maintain a constant speed of the rotation, servo-motors are used to move the aerodynamic panels toward or away from the rotation vertical axis automatically, increasing or reducing the angular speed, so as to compensate for variations of the wind speed. Also an inertial disk with a representative weight can be integrated to the largest gear in the base of the vertical shaft, increasing the inertia of the rotational movement.

When necessary, besides this control, the aerodynamic panels can have their capture areas increased or reduced to compensate the variations of great intensity in the wind speed. In this embodiment, flexible materials that can be rolled up with steel guides through servo-engines, or rigid materials that will be able to rotate are used to construct the panels. This system is able to amplify or to reduce the area of the aerodynamic panels during operation of the windmill. Such capability does not exist in the other wind force capture modalities like propellers or shells.

An electro-magnetic motor is optionally coupled to the same mechanism that moves the generator, with design and special gears or pulleys, to effectively control the rotation, opposing increase of the rotation while sending a message to a control unit to reposition, through the servo-motors, the aerodynamic panels. The panels are moved away from the main shaft in the instance of an increase in wind speed, or in the instance of a decrease in wind speed, the panels are moved toward the main shaft. Additionally, also through servo-engines, the area of wind capture of the aerodynamic panels can be changed by rolling them up them or rotating the blades of them, so that the motor and the rotation control sensor will no longer carry out the resistance function, and will begin to impel the rotation, while the panels approach to the shaft, thus avoiding the fall of the rotation, using for that pre-loaded batteries, exclusive to assist the rotation control engine (a starter electromagnetic motor with electromagnetic brake and accelerator). In instances of a prolonged failure of the wind force, for example for longer than three minutes, a combustion engine can work in the same way.

The present invention will be better understood through the detailed description of examples of embodiments of the invention and with reference to the drawings, however, these examples are not limitative of the invention.

DETAILED DESCRIPTION OF THE INVENTION

Figure 1:
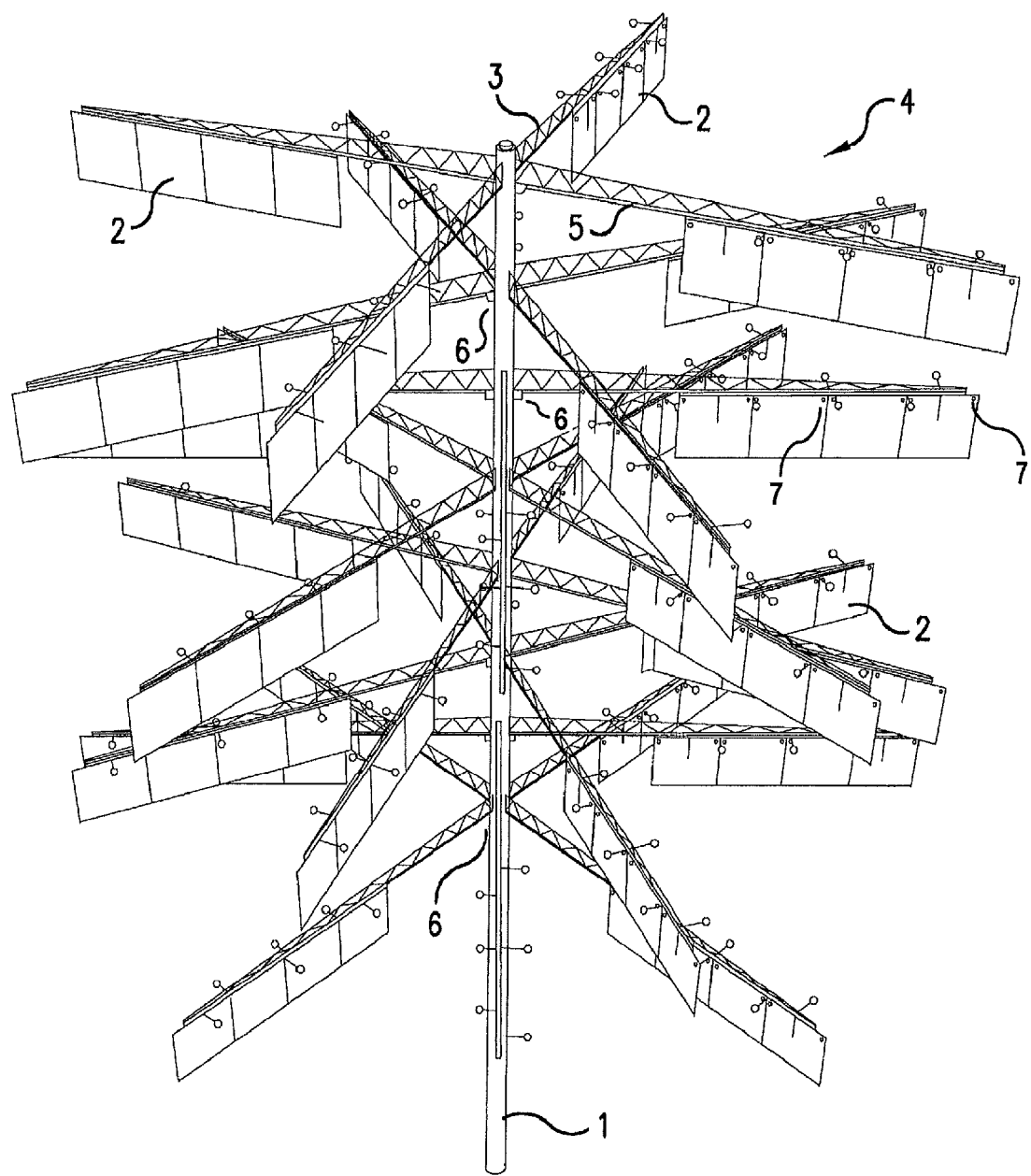
FIG. 01—Superior perspective view of the first embodiment of the invention.
Figure 2:
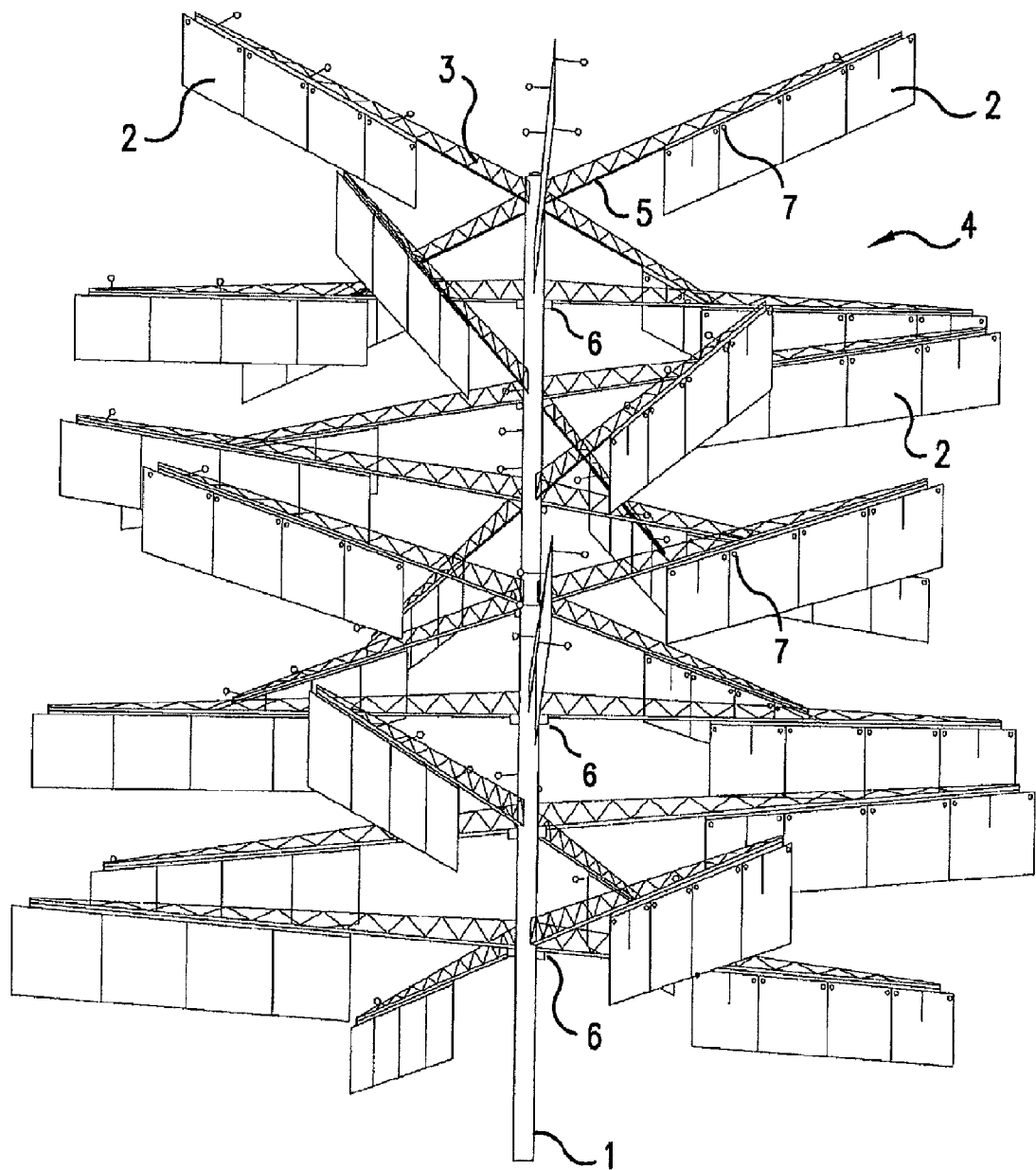
FIG. 02—Inferior perspective view of the first embodiment of the invention.
Figure 3:
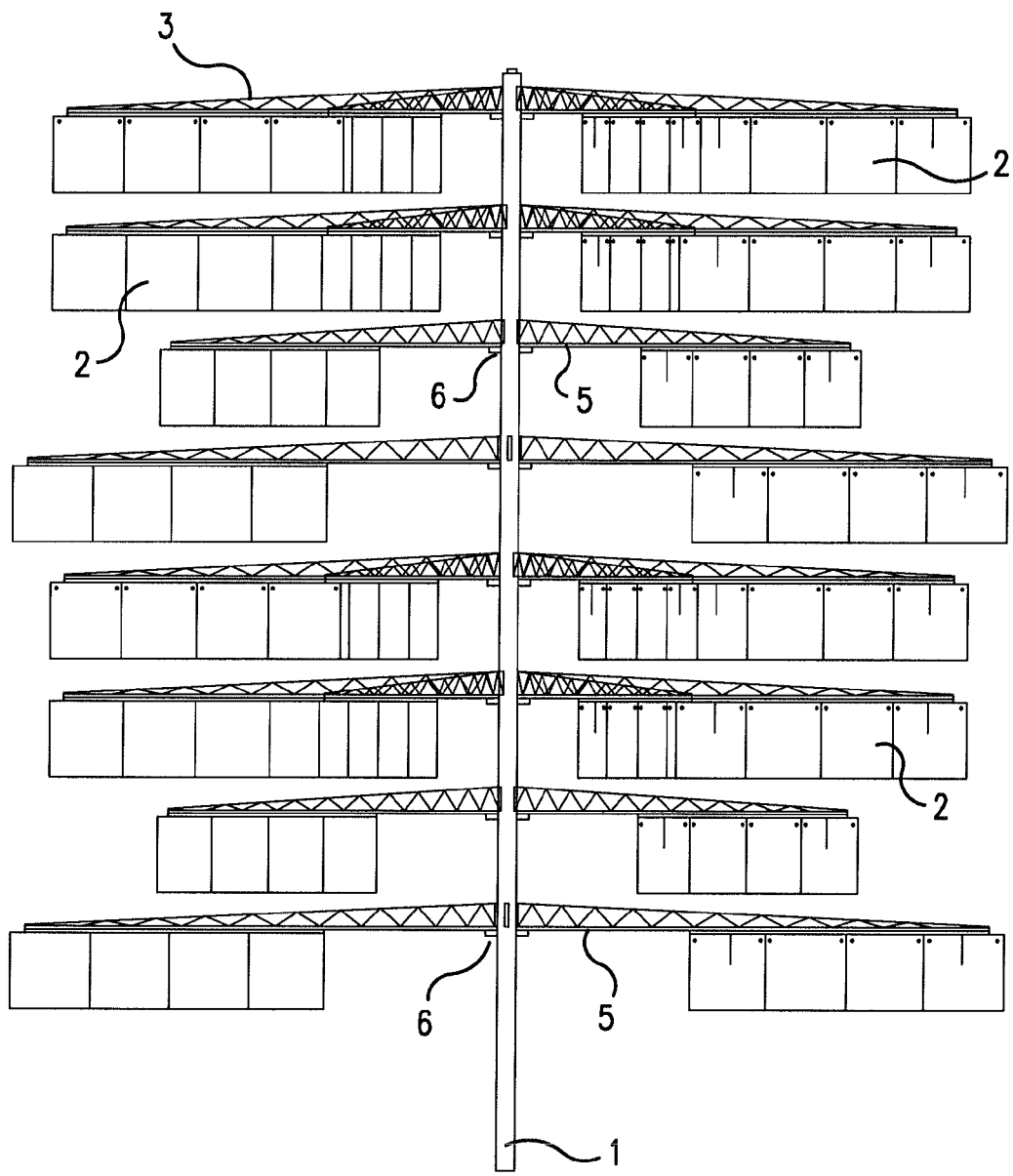
FIG. 03—Frontal view of the first embodiment of the invention.
Figure 4:
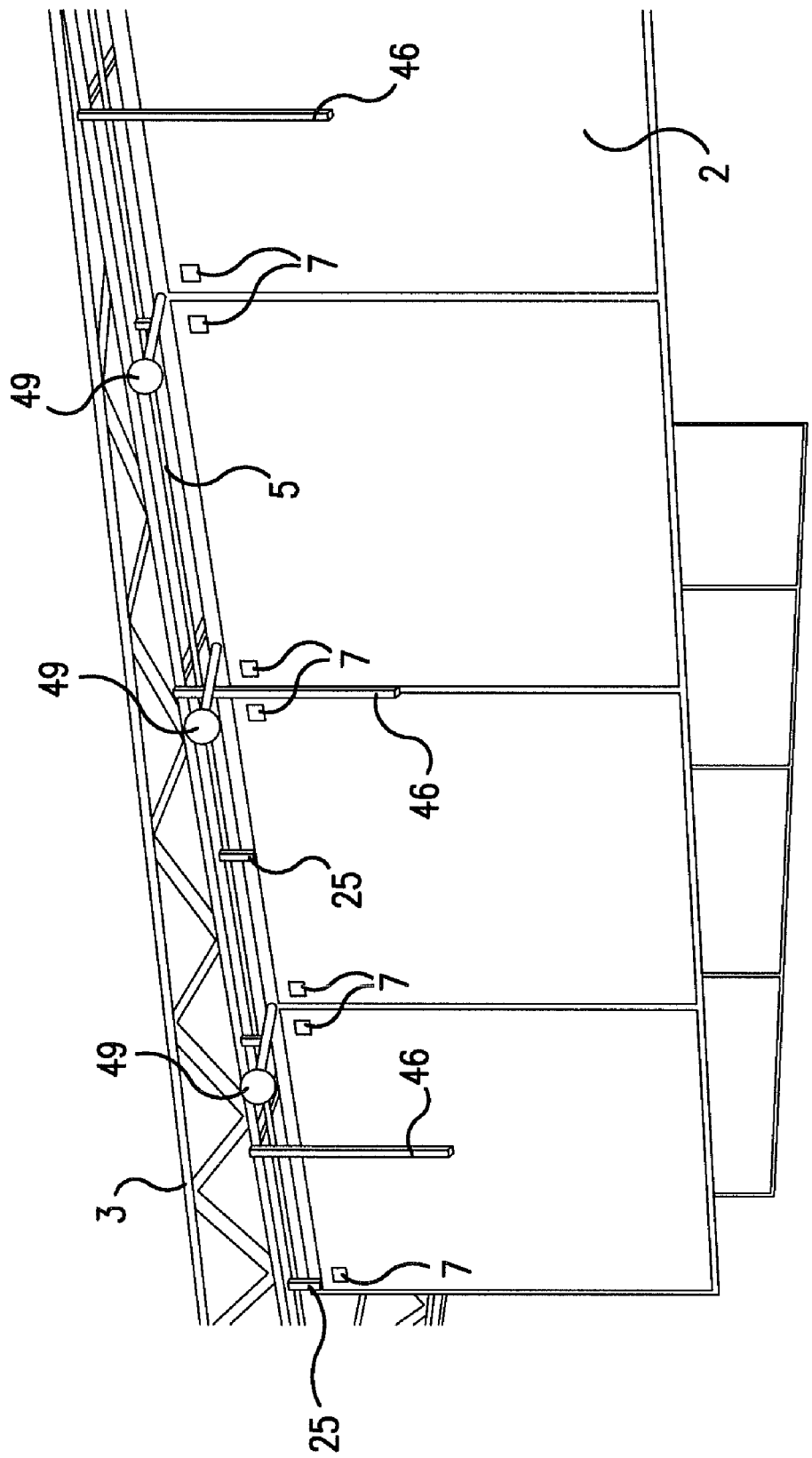
FIG. 04—Detail view of an aerodynamic panel of the first embodiment of the invention.
Figure 5:
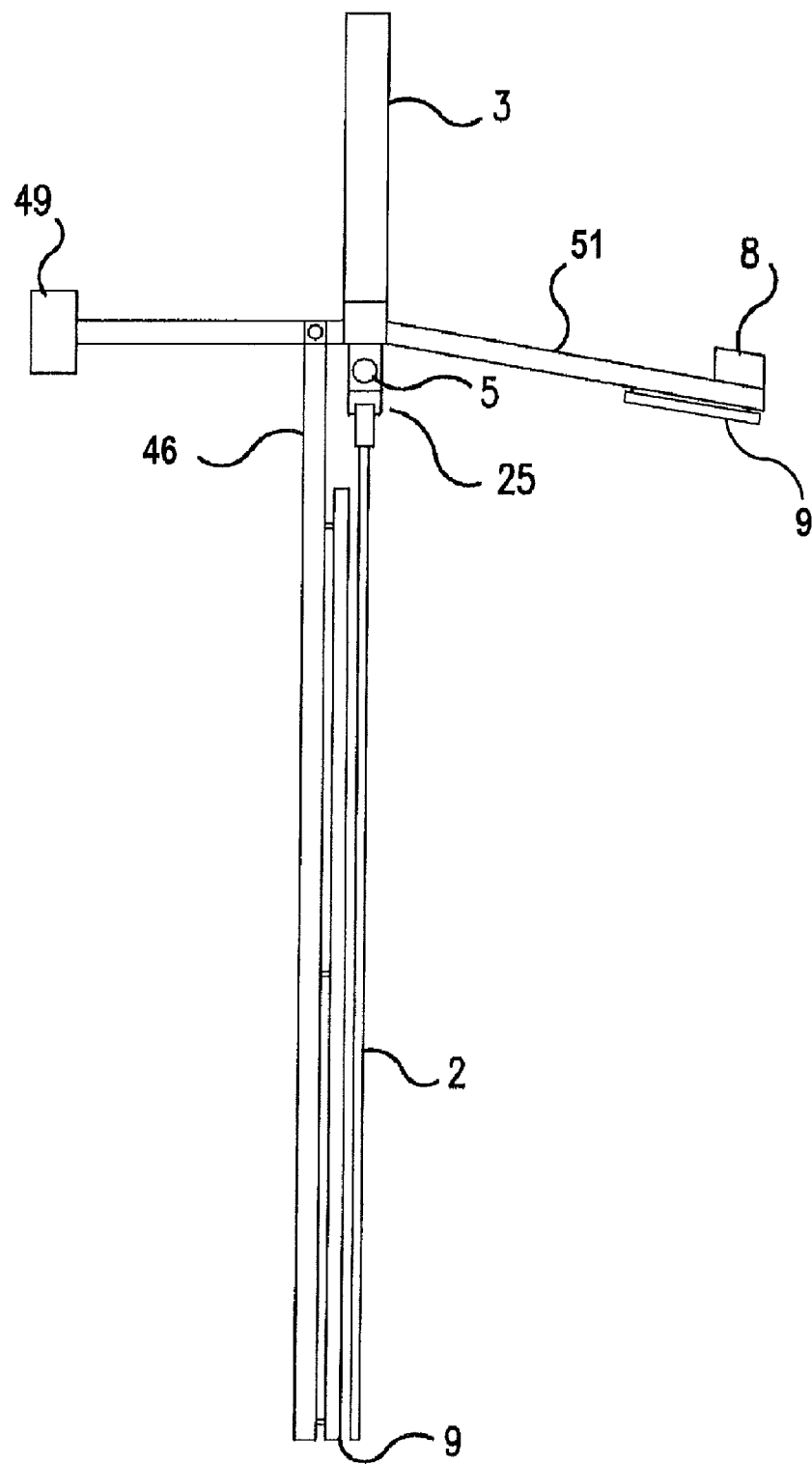
FIG. 05—Detail view of the side of an aerodynamic panel of the first embodiment of the invention.
Figure 6:
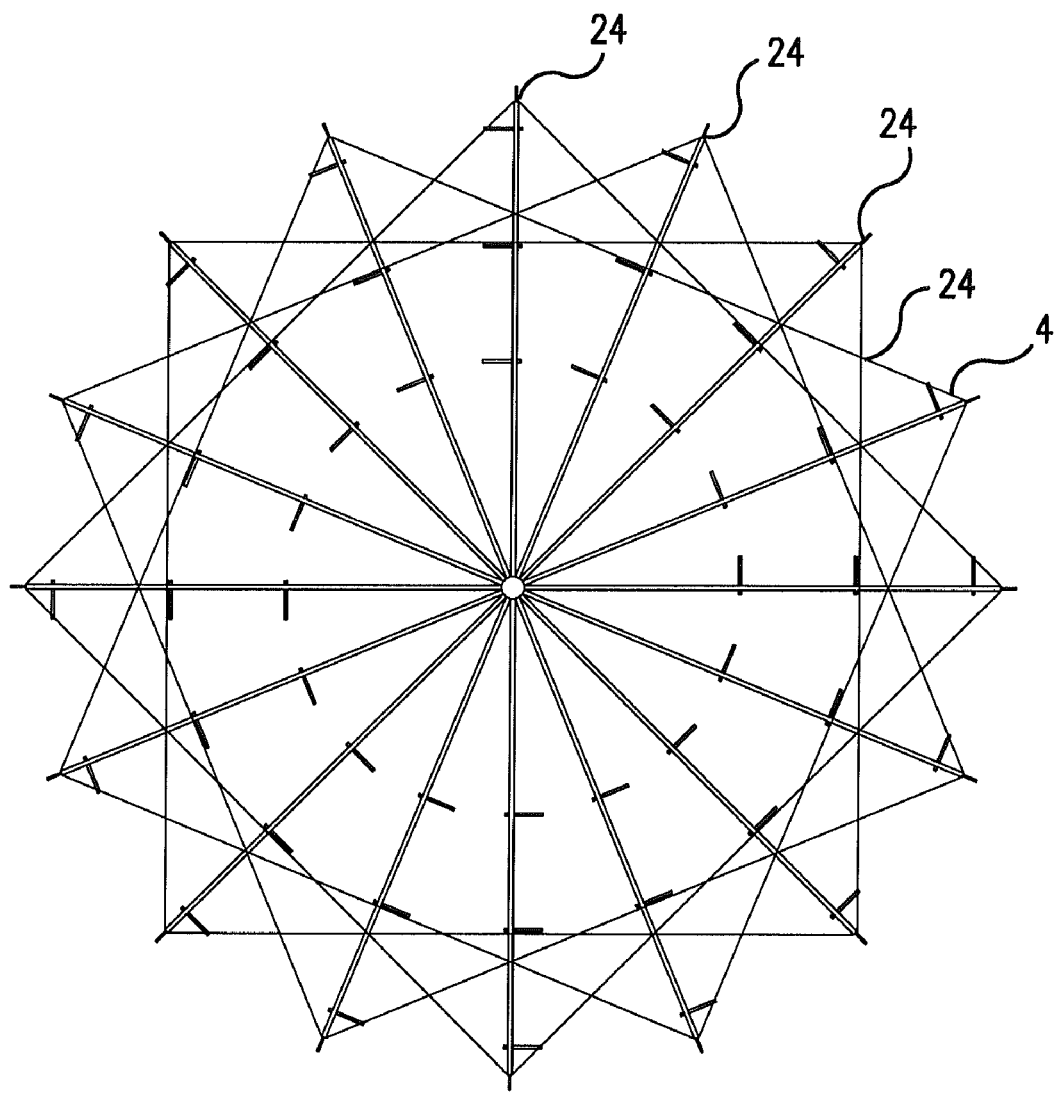
FIG. 06—Top view of the first embodiment of the invention.

For better understanding of the present invention there are described below two possible embodiments, however, the invention is not limited to the drawings and embodiments presented below.

First Embodiment of the Invention

This first embodiment of the present invention is intended for generation of energy at small and large scales, being a structure capable to reach great dimensions. Such configuration is characterized by having a wind capture system that allows transformation of above 97% of the wind force into rotational mechanical energy. Added to this great output is the possibility to add several levels of panels without limit for the size of the panels, which provides for a windmill using gigantic areas of reception of the wind force where are added the lift produced by the several levels of panels in order to allow a great area of wind reception for rotate the shaft, even with low wind speeds. This system does not need to be put in the wind direction because it provides traction independently of the wind direction, always rotating in the sense in that it was programmed to rotate, and it still has a device capable to control the rotation per minute of the cylindrical vertical hollow cover (1) through the movement of the aerodynamic panels toward and away from the vertical shaft. This configuration is characterized by having a cylindrical vertical hollow cover (1); aerodynamic panels (2) with controlled angular and translational movement; structured horizontal arms (3); structural fastening cables (4); horizontal rotation shafts (5); servo-motors for translation of the aerodynamic panels (6); servo-motors (7) to roll up the aerodynamic panels, reducing the panel surface area, and/or to rotate the panel, also reducing the panel surface area; a feathering solenoid (8) that, when energized, maintains the panels in a horizontal position; a shock absorber for the aerodynamic panels (9); inertial load wheel (10) endowed with a ratchet (50); rack (11); generator bevel gear (12); RPM multiplier box (13); elastic coupling (14); alternating current generator (15); coupling hydraulic clutch with elastic coupling (16); combustion motor (17); starter electromagnetic motor with electromagnetic brake and accelerator (18); rotation sensor (19); central control and administration system (20); surface bearings (21) and support bearings (22); a cylindrical vertical post (23), where the aerodynamic panels (2) are fixed to horizontal shafts (5) in a way to allow the panels to make a quarter-circle movement and also to translate in both directions along the extension of the horizontal shafts (5), maintaining the angular speed of the cover (1) constant, and the horizontal arms (3) are fixed to the cover (1) forming crossbars (24) and in each horizontal plane these crossbars (24) are arranged so that the angle among them is given by the division of the angle of 90° by the number of crossbars. Counterbalances (49) are used in cases where the panels possesses a significant weight in a way to facilitate the feathering of the panels; ratchet (50), that assures that the system rotates in just one sense; and upper stoppers (51), that maintain the aerodynamic panels in the vertical position when they are being impelled by the force of the wind.

The cover (1) is inserted on the top of the structural post (23) and sustained by surface bearings (21) and support bearings (22) that allow the cover to rotate freely around the post with little resistance in the angular movement. The post (23) can be fixed directly to the ground through the conventional foundation techniques and infrastructure. As this windmill system works with larger efficiency at altitudes where the winds are more uniform, the post of the windmill and all the structure can be fixed on a construction that elevates the windmill to the ideal height of operation, and in this way, is avoided the need for construction of a post (23) and a cover (1) with the same size of the ideal height of operation. For example, if a place possesses homogeneous winds to a height of 100 meters, then, the converter can be fixed on a construction of 50 meters and the post (23) and the cover (1) can have a height of approximately 50 meters, instead of 100 meters.

The aerodynamic panels (2) are connected to the horizontal rotation axis (5) through threaded supports (25) that allow the translation of the panels (2) in both directions along the shafts (5) through the drive of the translation servo-motors (6) and also allow the rotation of the panels (2). On receiving the wind force on their front part the panels remain in a vertical position, sustained by the aerodynamic panel shock absorber (9), producing impulse to the horizontal arms (3) and rotating the cover (1), and when the aerodynamic panels (2) receive the wind on their back side, they raise up, being almost in the horizontal position, sustained by the upper stoppers (51), executing a quarter-circle movement. The aerodynamic panels (2) are plane and laminated, facilitating their displacement by the force of the wind feathering in a moment or coming back to the vertical position to impel the horizontal arms (3). As a consequence the cover (1) is rotated, rotating the inertial load wheel (10) that transmits the rotation to the generator bevel gear (12) connected to the rack (11).

In this way, the horizontal rotation of the panels (2) provoked by the winds is transmitted to the generator (15) that receives this rotation already properly increased by the RPM multiplier box (13) in agreement with the characteristics of the alternating current generator (15). The RPM multiplier box (13) is connected to the generator (15) by an elastic coupling (14) that allows the transmission of the rotation to the generator (15) without causing damages to the rotor shaft of the generator. A combustion motor (17) is linked to the same generator rotor shaft at the other extremity of the generator (15) through a coupling hydraulic clutch with elastic coupling (16). This clutch (16) is worked by the central control and administration system (20) at times when there is an absence of wind, very weak winds or moments of storms, to maintain the rotation of the generator (15) constant. However, before the combustion motor (17) is started, the system starts an electromagnetic motor (18) in order to maintain the windmill rotating constantly. The electromagnetic motor (18) also exercises the brake function when it is necessary to stop the equipment for maintenance. Only in times that the wind is out of the normal, longer than a pre-determined period, then the combustion engine (17) will be started and the electromagnetic motor (18) turned off.

The aerodynamic panels (2) can be made of metallic materials, plastics, synthetic fibers, or woven. The materials should be light, resistant to water and the effects of weather. Any material with such characteristics that resists the force of the winds can be used.

The aerodynamic panels (2) possess a rigid frame of a light material, such as metals, metallic alloys, aluminum, carbon fiber, iron, steel, or plastics to maintain the rigid panels in their form when they are under the pressure of the wind.

When the aerodynamic panels are made from a flexible material, the frames of the aerodynamic panels (2) can be endowed with a system for rolling up the aerodynamic panels powered by the servo-motors (7). Such a system decreases the wind force capture area, working as one more devices to control the rotation of the wind converter. Another possible way to reduce the surface area of the panels is the construction of the panels with rigid foils as blades inclinable by servo-motors (7), such that when the servo motors are worked, they rotate the foils, reducing their lift when a reduction of wind capture area is necessary or conversely increasing the lift in the case of failure of the speed of the wind.

In times of windstorm or storm, solenoids (50) fastened in the extremities of the upper stoppers (51) are energized creating a magnetic field capable to maintain the aerodynamic panels in a horizontal position, avoiding damage to the panels (2) and the windmill.

The horizontal shafts (5) are threaded to form endless screw and they are connected to the translation servo-motors (6) that can rotate the horizontal shafts (5) in the clockwise and counterclockwise sense, thus moving the aerodynamic panels (2) away from or toward the cover (1), so maintaining the angular speed of the inertial load wheel (10) and consequently keeping the speed of the generator (15) constant.

The horizontal arms (3) can be of a self-sustained, tubular form or have a trellis structure connected to the cover (1). The horizontal arms (3) can also be sustained by steel cables attached among the extremities of the arms (3) and to the cover (1) sparing the trellis structure. The horizontal arms (3) are interlinked to each other through steel cables (4) giving greater rigidity and stability to the group of arms (3) in a same plane that forms crossbars (24).

The upper stoppers (51) and stoppers (46) are endowed with shock absorber (9) that soften the impact of the aerodynamic panels (2) upon the stoppers without damaging them.

The cylindrical cover (1) is endowed with an inertial load wheel (10) in the lower extremity. The inertial load wheel (10) has a rack (11) for transmission to the generator bevel gear (12) of the RPM multiplier box (13) and to the bevel gear of the electromagnetic motor (18) for control of the rotation. This inertial wheel (10) is assembled on a ratchet (50) that impedes that the converter is impelled by the combustion or electric emergency engine in the moments that there is fault of the wind.

The alternating current generator (15) generates a constant energy output and with absence of fluctuation of the cycle and, consequently, absence of noises in function of the constant rotation of the cover (1) proportioned by the control of the distance of the aerodynamic panels (2) from the cover (1) and/or by the control of the wind force capture area of the aerodynamic panels (2) and/or of the control of the inclination of the panels (2) and also of the electromagnetic motor (18) controller.

The converter is endowed with a combustion engine (17) to maintain the rotation of the generator (15) constant in cases of weak wind or windstorms and storms, or, in substitution to the combustion motor, being used the energy of the existent electric net.

The electromagnetic motor (18) is responsible for removing the inertia of the system when the windmill is stopped in the case that the wind is momentarily not strong enough to impel the converter. Such motor (18) also has auxiliary function in the control of the constant rotation of the cover (1) when used as a magnetic brake, increasing or reducing the load on the inertial load wheel (10). This motor is also used to brake the converter, simultaneously with feathering of all of the aerodynamic panels, to allow maintenance.

A rotation sensor (19) monitors the rotation of the inertial load wheel (10) serving as a parameter for the control of the constant speed of the generator (15) guaranteeing output of energy from the cycle in a desirable pattern.

The management of the converter is executed by a central control and administration system (20) that administers the energy generated by the generator (15) maintaining constant output through the drive of the motors (6), (7), (17) and/or (18) based on feedback of information of the momentum of the rotation sensor (19) of the cycle, of the tension and of the momentary output of current from the generator (15). In spite of not being shown in the FIGURES, there are foreseen sensors of current and voltage in the output of the generator (15), as well as an anemometer with sensors that constantly analyze the wind speed to inform a CPU that manages the whole system.

These devices located in the base of the windmill for power generation and administration are protected by a covering that prevents these devices being reached by rain and sun.

Second Embodiment of the Invention

A second embodiment of the windmill, intended for the illumination of coastal areas and small communities, is characterized by possessing a system for capture of the wind that allows use of between 90 and 98% of the wind force for the transformation into rotational mechanical energy. At the same time this embodiment provides high efficiency by the possibility to add several levels of panels, this system does not need to be oriented for the direction of the wind, because the converter traction is independent of the direction of the wind, always rotating in the sense in that was programmed to rotate.

This converter is endowed with a cylindrical vertical post (23); plane aerodynamic panels (2); horizontal shafts (26); a rotating vertical shaft (27); rotational group bearings (28) of the group rotor; rotational vertical shaft bearings (29); pulleys (30) (31) (32) (33); continuous current generator (34); control circuit (35); brightness sensor (36); reactor (37); batteries (38); conduit wire (39); lamps (40), fixation post base (41); a fixation post base cover (42); a rotational group (43) where the aerodynamic panels (2) are fixed through hinges (44) to the horizontal shafts (26) so that a side of the hinges (44) is fixed in the lower part of the horizontal shafts (26) and the other side of the hinges (44) is fixed in the upper part of the panels (2), and the horizontal shafts (26) are fixed in a rotational group (43) forming crossbars (24) and in each horizontal plane the crossbars are arranged so that the angle among them is given by the division of the angle of 90° by the number of crossbars used.

In the present embodiment the rotational group (43) can be endowed with four or more crossbars (24), to results in an angle of 22.5° among the crossbars, when endowed with four levels of crossbars, or smaller when endowed with more than four crossbars, where the angle is given by the division of the angle of 90° by the number of crossbars.

The rotational group (43) is inserted in the top of the post (23) and supported by rotational group bearings (28) so that it freely rotates around the vertical post.

The horizontal shafts (26) are endowed with upper stoppers (51) and stoppers (46) that form an angle of 80° to each other, so that one of the parts is 90° to the horizontal shaft (26) allowing that the panels (2) are supported when they receive the wind on their front, maintaining their vertical position, offering like this the maximum surface contact with the wind and taking advantage of the wind force. The other part makes an angle of 10° degrees with the horizontal so that when the wind beats on the back of the aerodynamic panel (2) it is in an almost horizontal position, and the angle of 10° allows that when the panel rotates its front to the wind, it quickly lowers to the vertical position, impelling the rotational group.

The stoppers (46) and upper stoppers (51), in the part that make contact with the panels (2), are covered with shock absorbent material in a way to soften the impact between the panels (2) and the stoppers (46) preserving the integrity of the panels (2).

The aerodynamic panels (2) are planes and of minimal thickness, compared to their width and length. The panels are made of metallic materials, plastics, synthetic fibers, or woven materials and are resistant to water and bad weather and offer great resistance to the wind when it reaches them on their front. By virtue of their low weight the panels (2) are easily lifted up when the wind reaches them from behind.

The aerodynamic panels (2) can have a rigid frame made of a light material, such as aluminum, carbon fiber, plastic or similar materials with characteristics of high stiffness and low weight.

The post (2) is fixed in the fixation post base (41) through welds to the reinforcement ring (47). The fixation post base (41) is formed by four tubular supports and a reinforcement ring (47) that ties the supports to each other making an angle of 90° among them.

The tubular supports have a bend with an angle that can vary between 20° and 45° depending on the base size to be built.

The rotational vertical shaft (27) extends from the top of the post (23) even after the base of the post leaning on in the lower plate (48), and in each extremity of the rotational vertical shaft (27) is a bearing (29). These bearings are responsible for the free rotation of the rotational vertical shaft (27). A pulley (30) is fixed at the bottom of the rotational vertical shaft (27) that transmits the rotation to the smaller transmission pulley (31). On the same shaft of the pulley (31) is the larger transmission pulley (32) that transmits the rotation to the generator pulley (33). These pulleys can be substituted by gears, that have the function of increasing the rotation.

The generator (34) adopted in this configuration can be of the continuous average type or alternator.

The energy generated by the continuous current generator (34) is administered by a control circuit (35) that is connected to the continuous current generator (34), with a brightness sensor (36), with the reactor (37), and with the batteries (38) sending and receiving energy, and connected with the lamps (40) just sending energy. These batteries are dimensioned in agreement with the characteristics of the regime of the winds of the place where the windmill will be installed, and can be dimensioned to supply power in the absence of winds for one hour or more.

A conduit wire (39) is desired in the internal wall of the post (23) linking the reactor (37) to the lamps (40).

Figure 7:
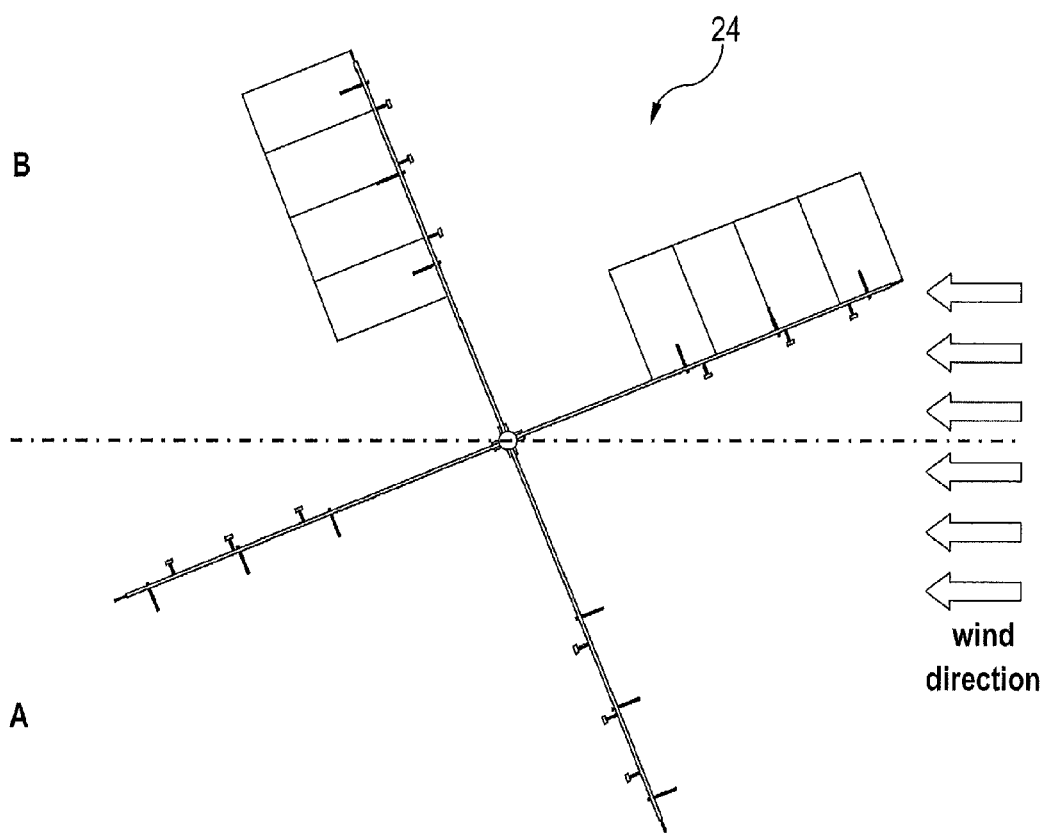
FIG. 07—Top view of the first embodiment of the invention illustrating only one crossbar.
Figure 8:
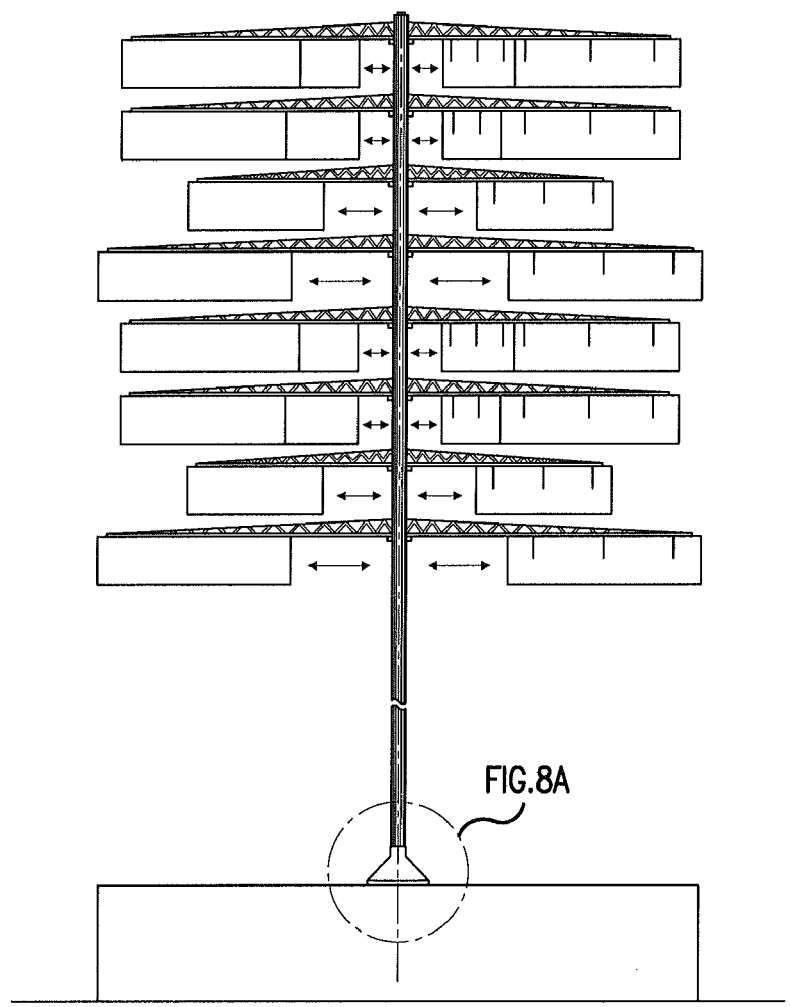
FIG. 08—Cutaway frontal view of the first embodiment of the invention illustrating the displacement sense of the aerodynamic panels and the protective cover of the devices of energy generation system linked to the ratchet in the converter base as illustrated in the FIG. 09.
Figure 8A:
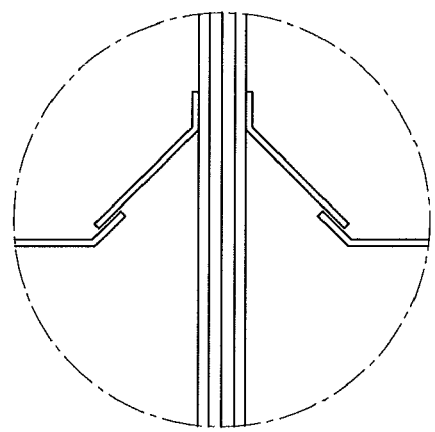
Figure 9:
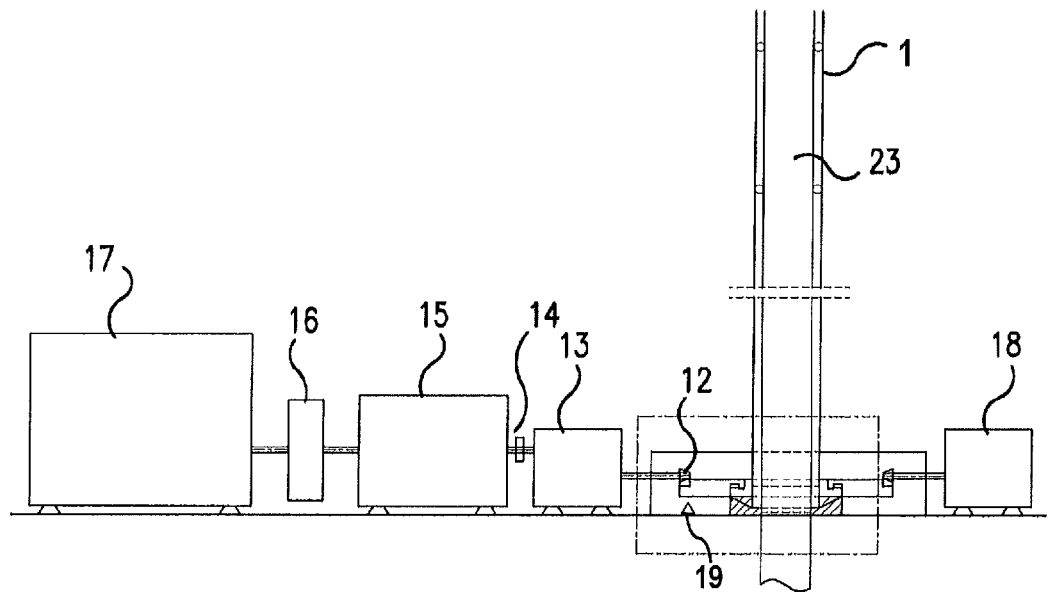
FIG. 09—Cutaway frontal view of the base of the first embodiment of the invention.
Figure 9A:
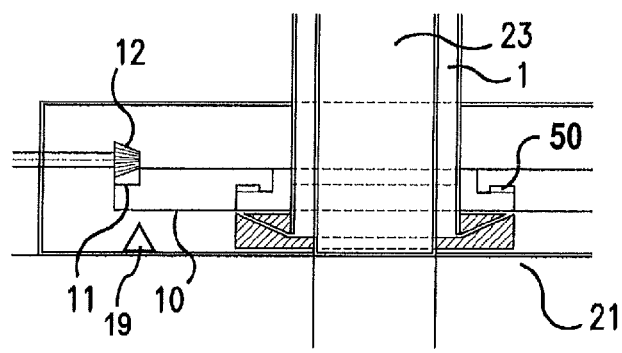
FIG. 09A—Detail view of the inertial load wheel.
Figure 10:
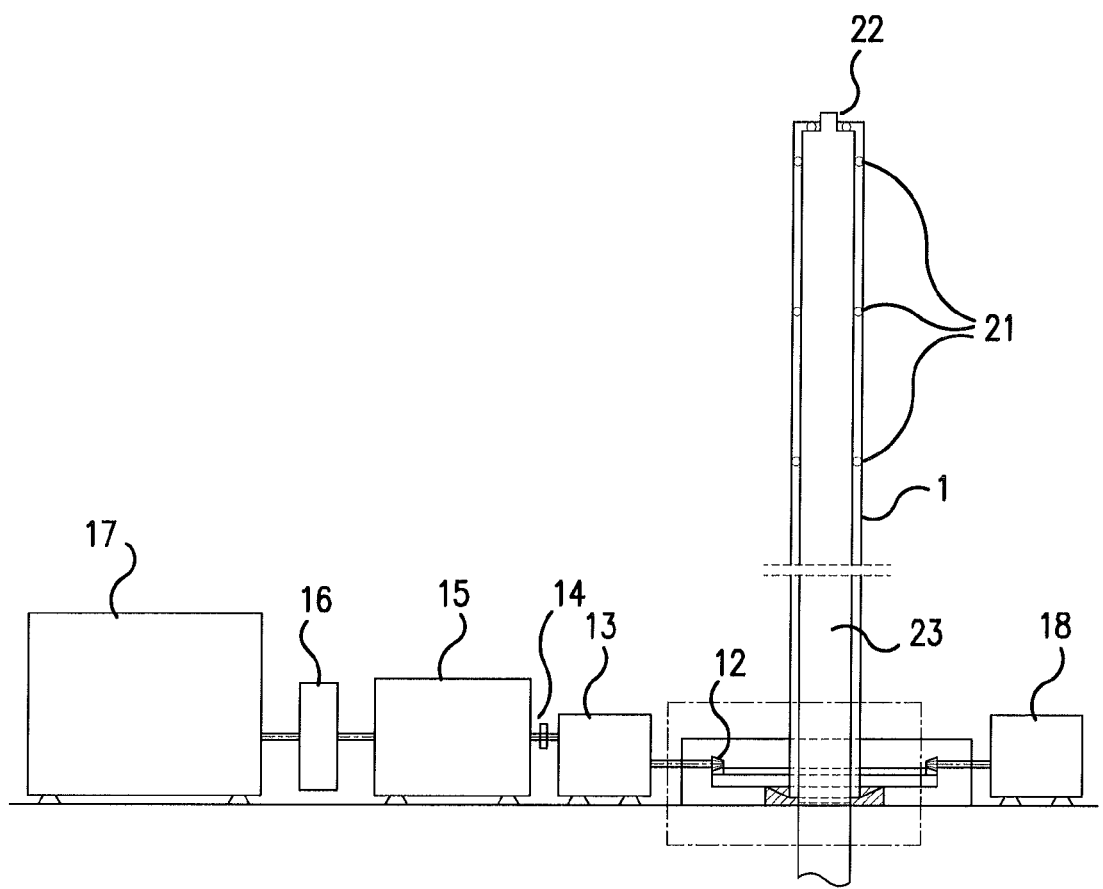
FIG. 10—Cutaway frontal view of the base of the first embodiment of the invention and the cylindrical vertical post illustrating its top.
Figure 11:
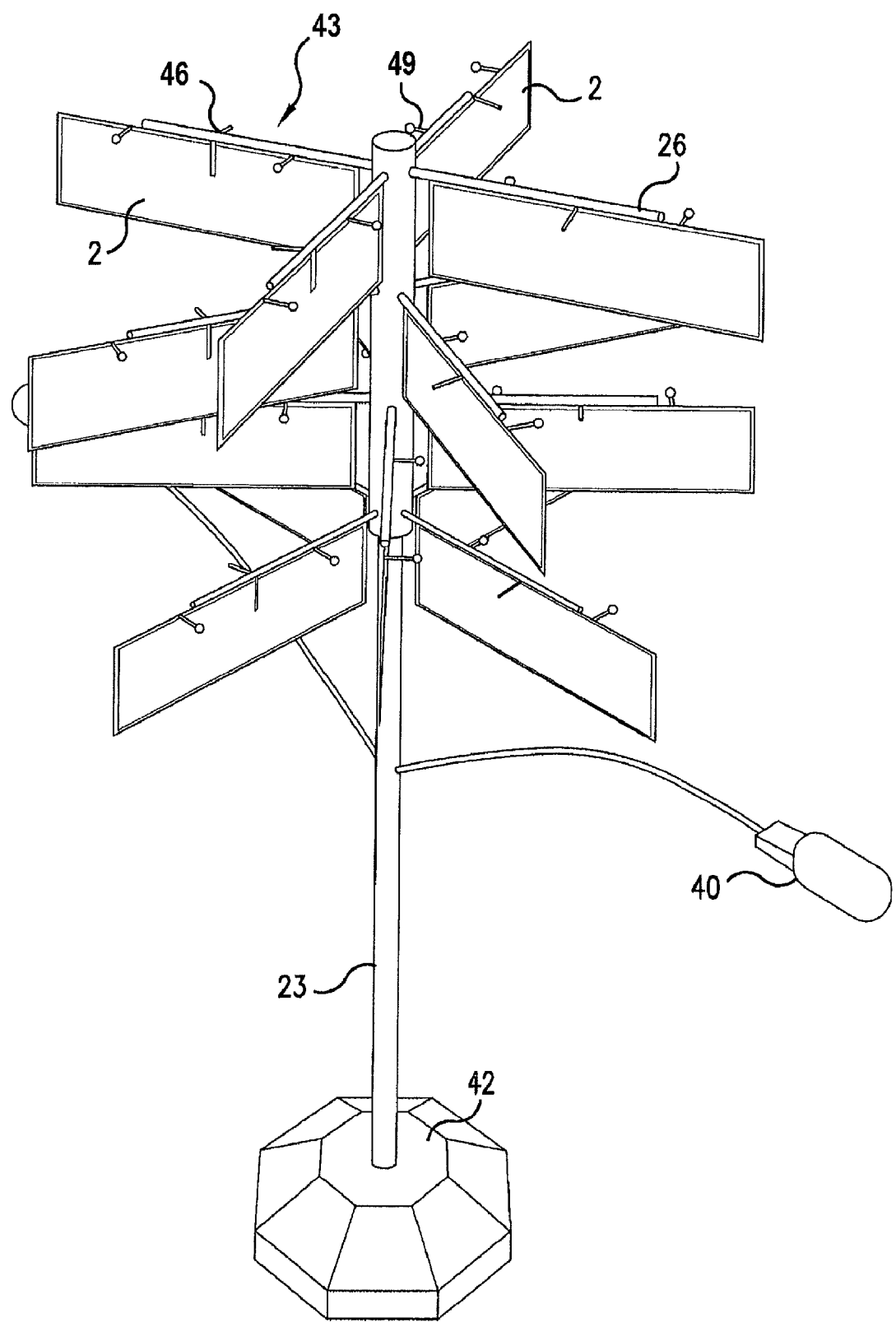
FIG. 11—Superior perspective view of the second embodiment of the invention.
Figure 12:
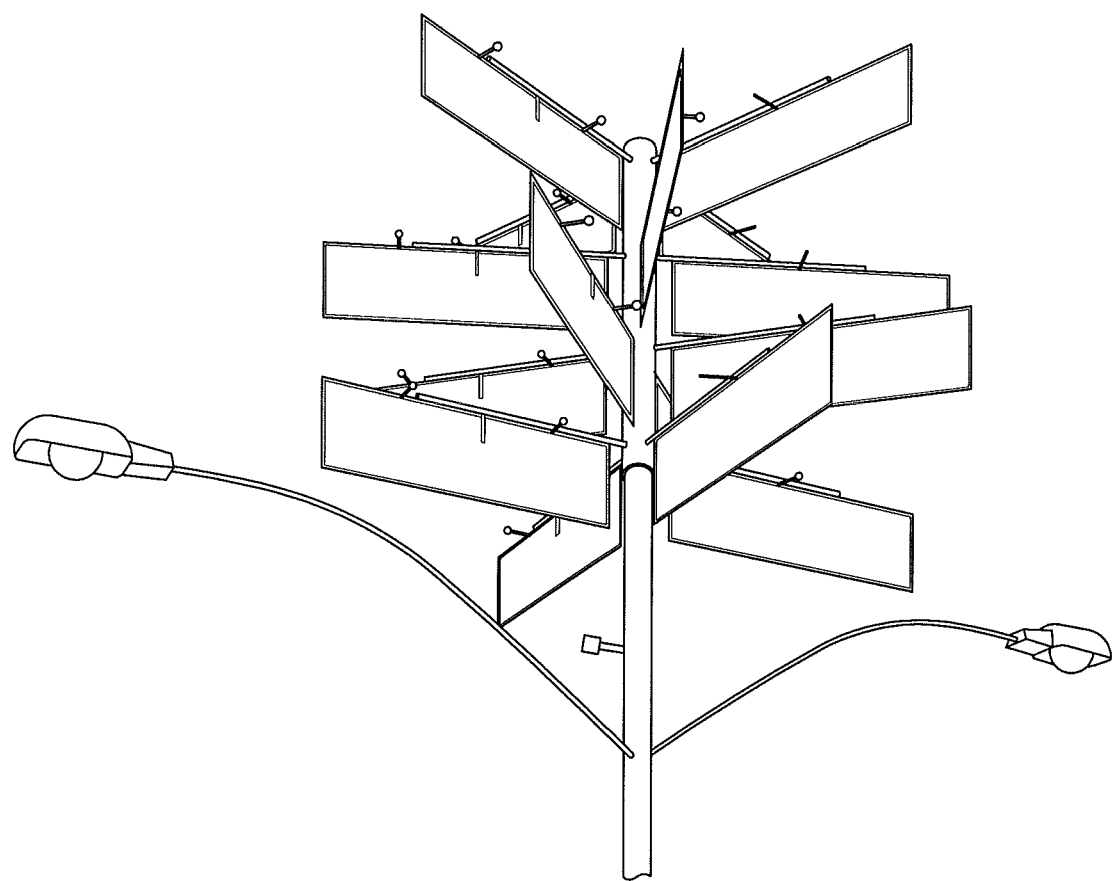
FIG. 12—Inferior perspective view of the second embodiment of the invention.
Figure 13:
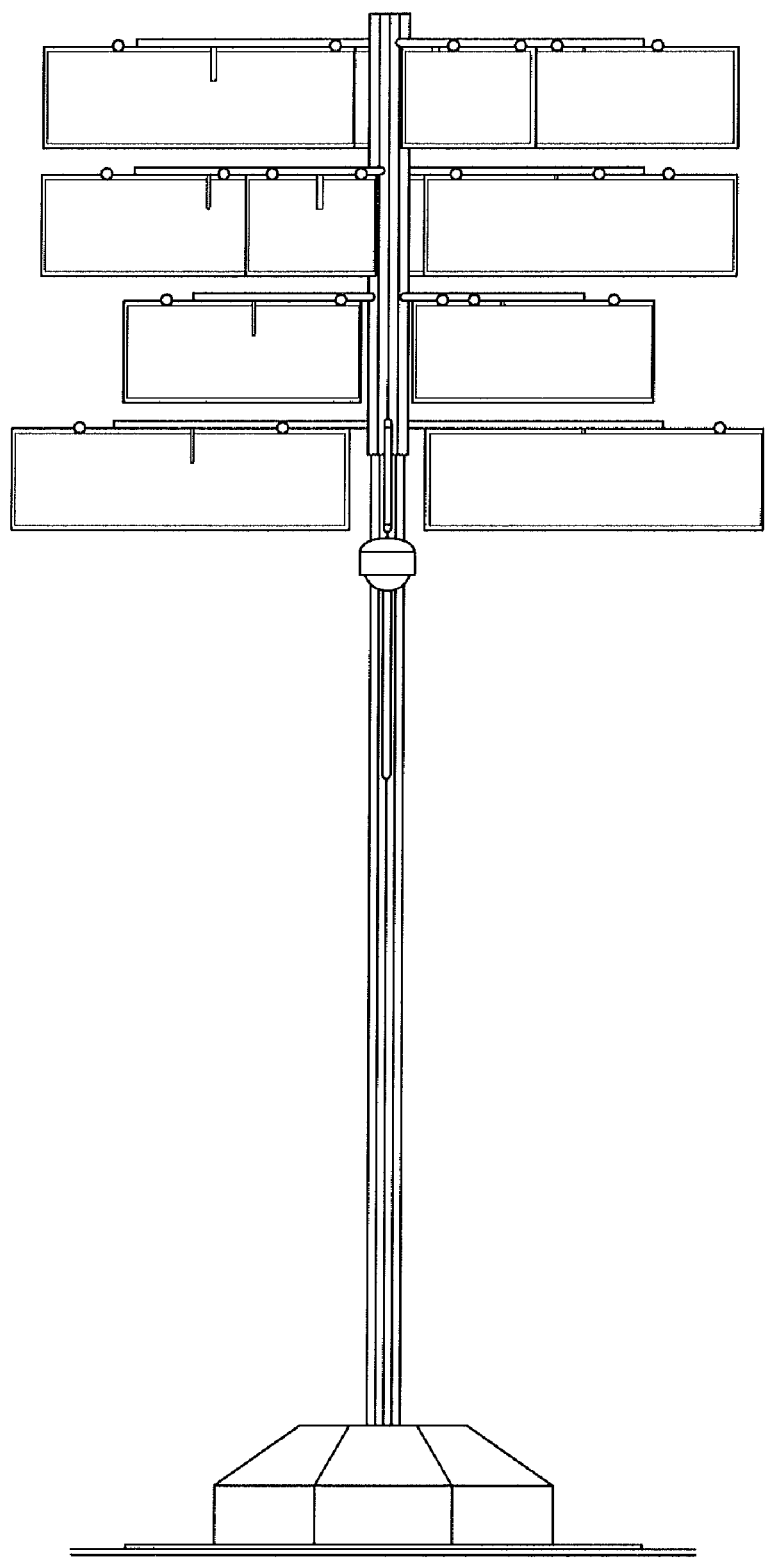
FIG. 13—Lateral view of the second embodiment of the invention.
Figure 14:
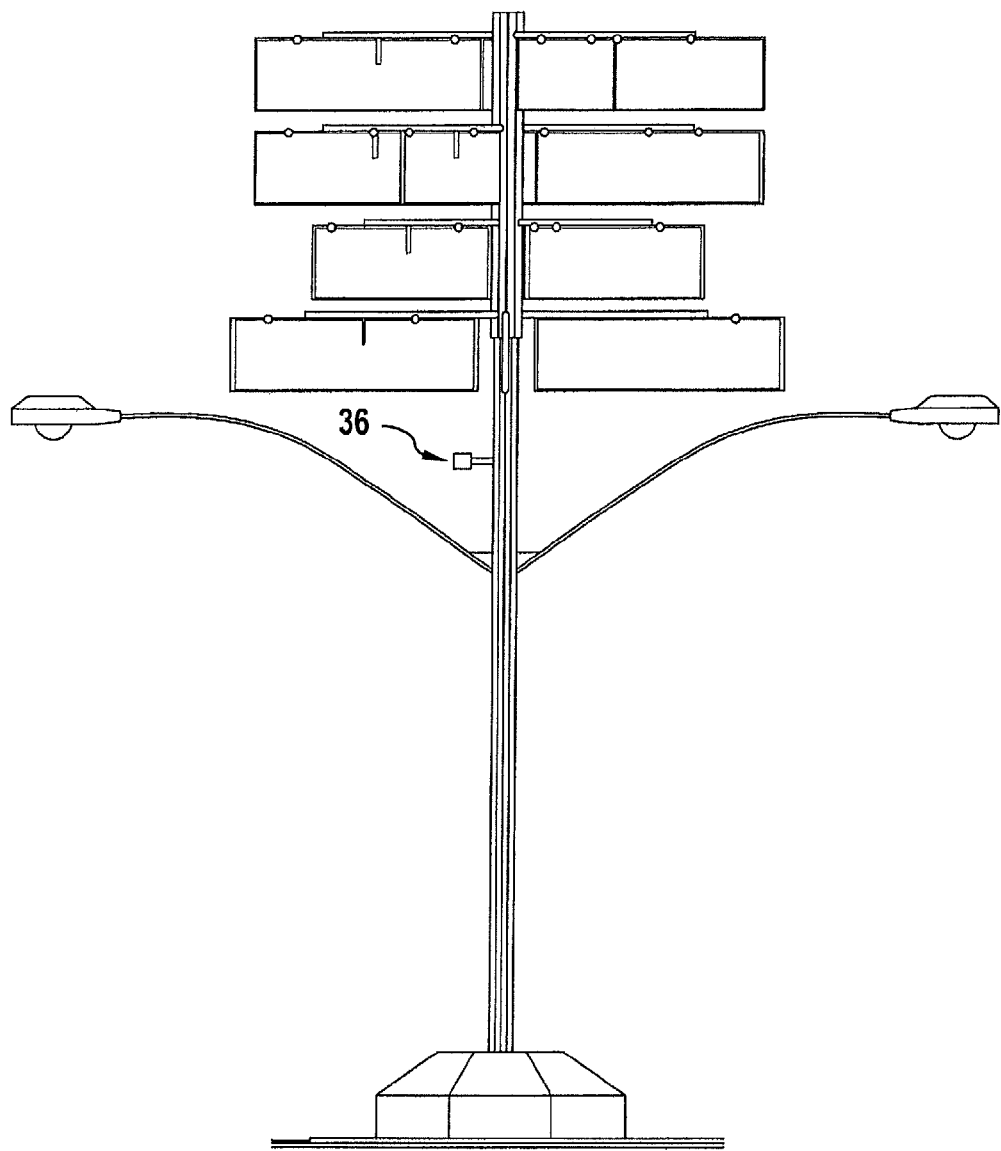
FIG. 14—Frontal view of the second embodiment of the invention.
Figure 15:
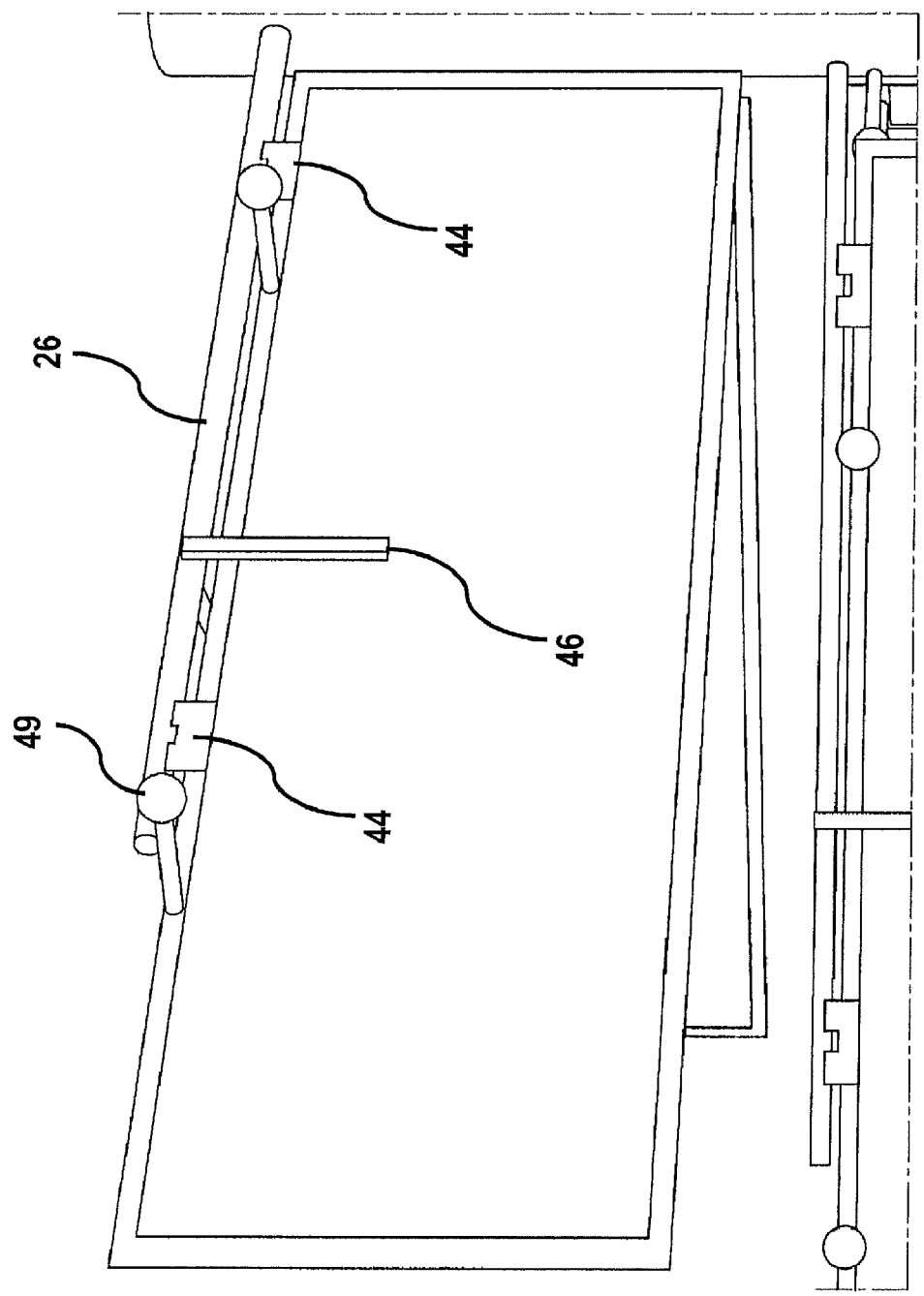
FIG. 15—Detail view of the aerodynamic panel of the second embodiment of the invention.
Figure 16:
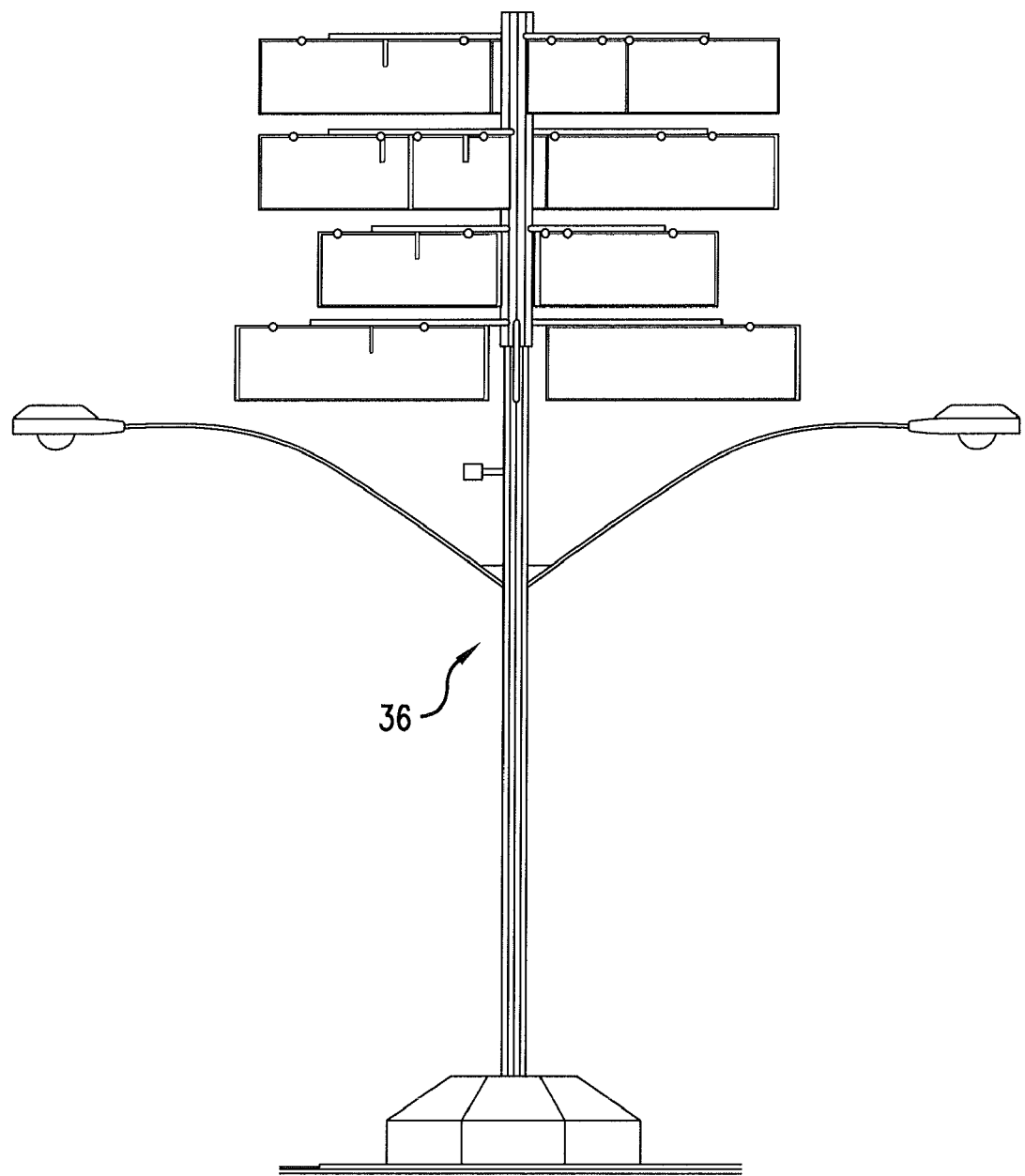
FIG. 16—Cutaway frontal view of the second embodiment of the invention.
Figure 17:
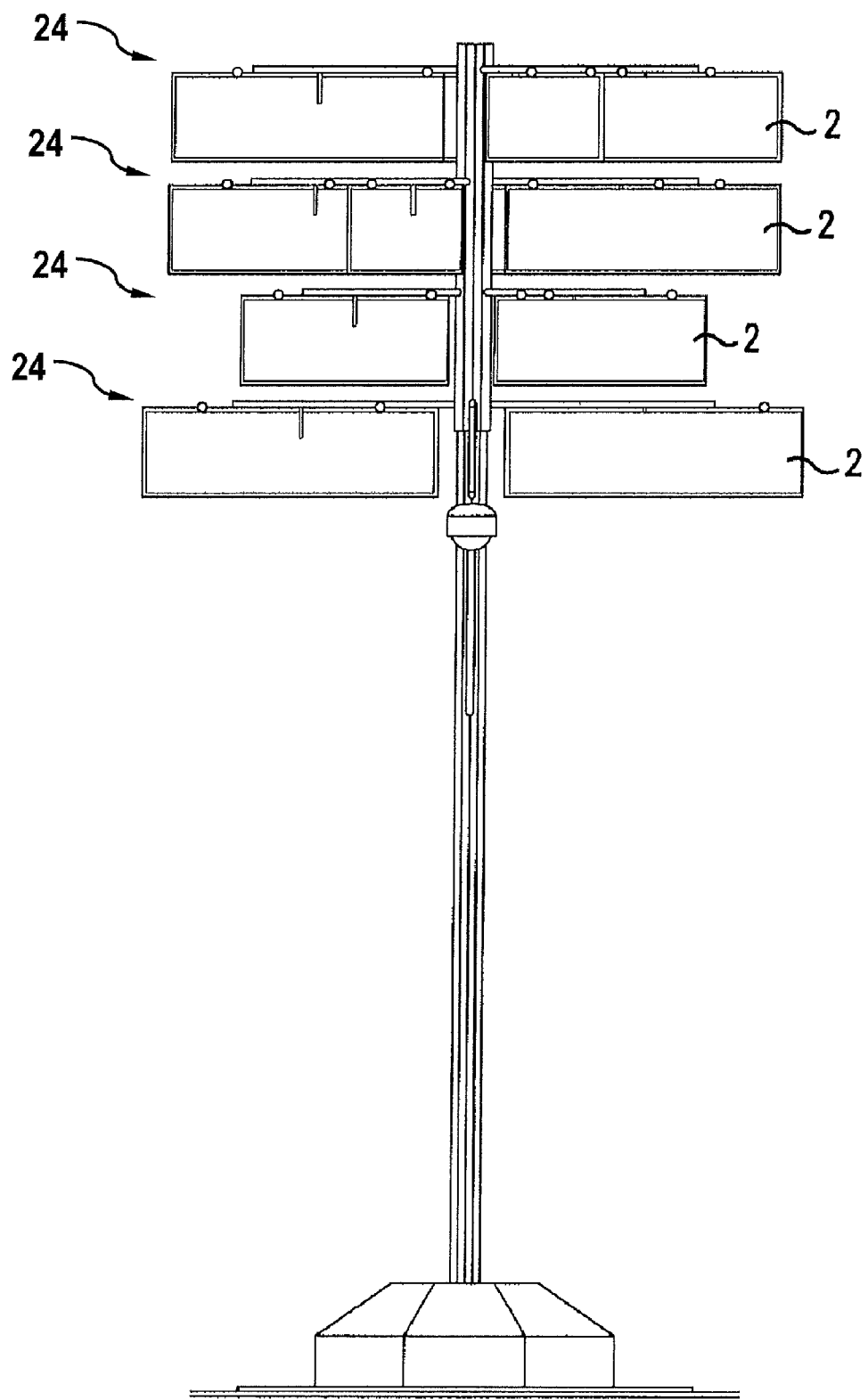
FIG. 17—Cutaway lateral view of the second embodiment of the invention.
Figure 18:
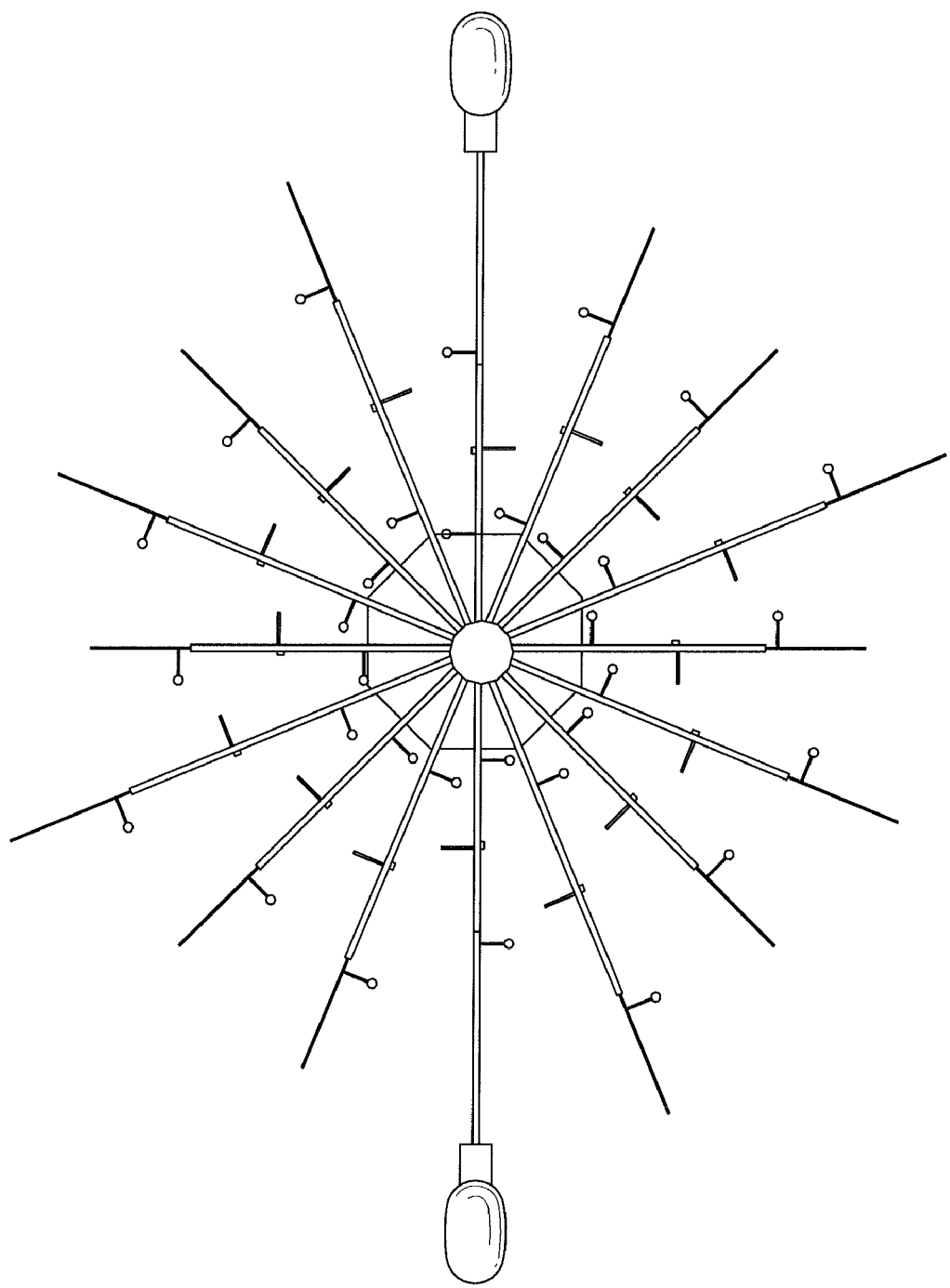
FIG. 18—Top view of the second embodiment of the invention.
Figure 19:
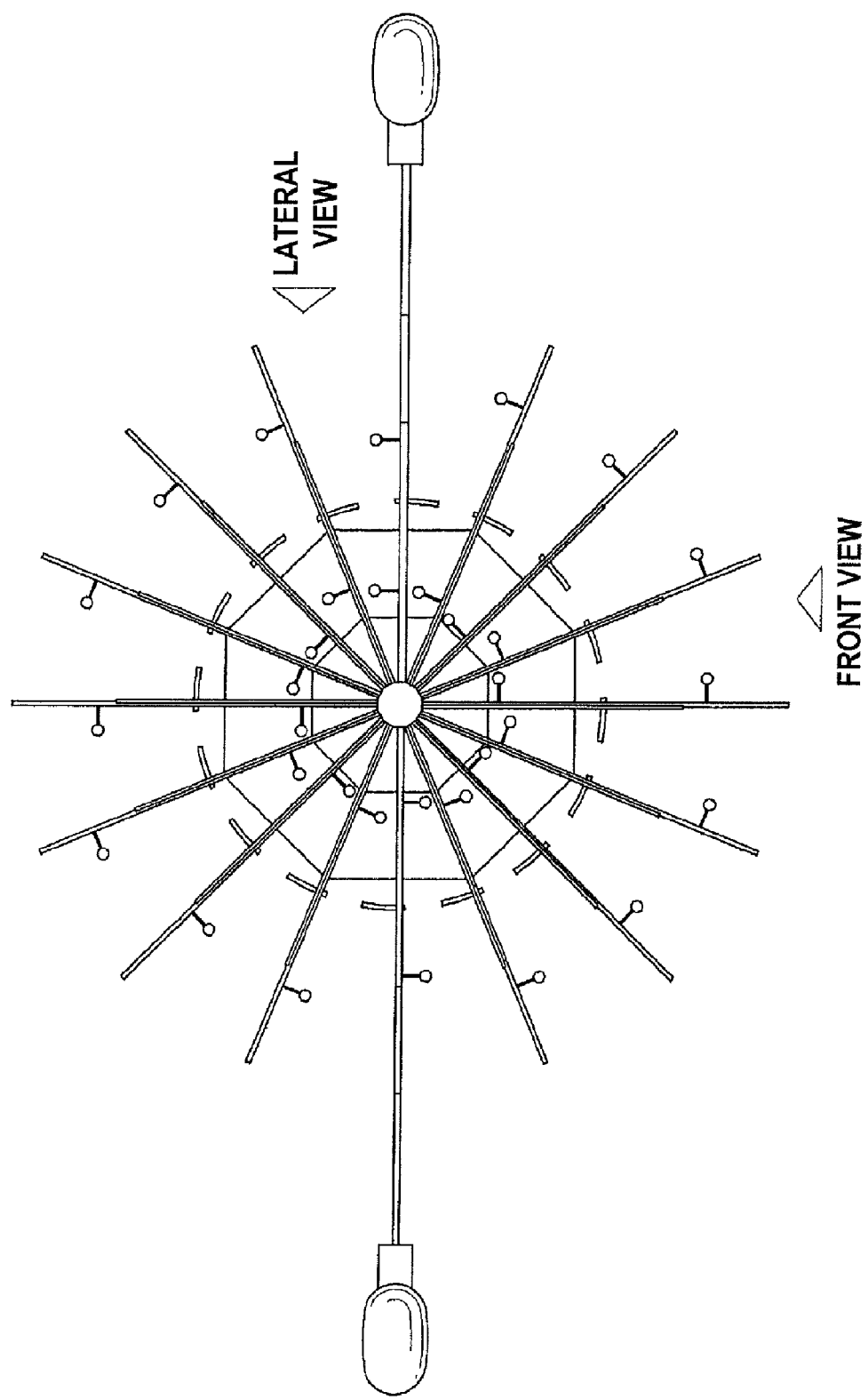
FIG. 19—Cutaway top view of the second embodiment of the invention.
Figure 20:
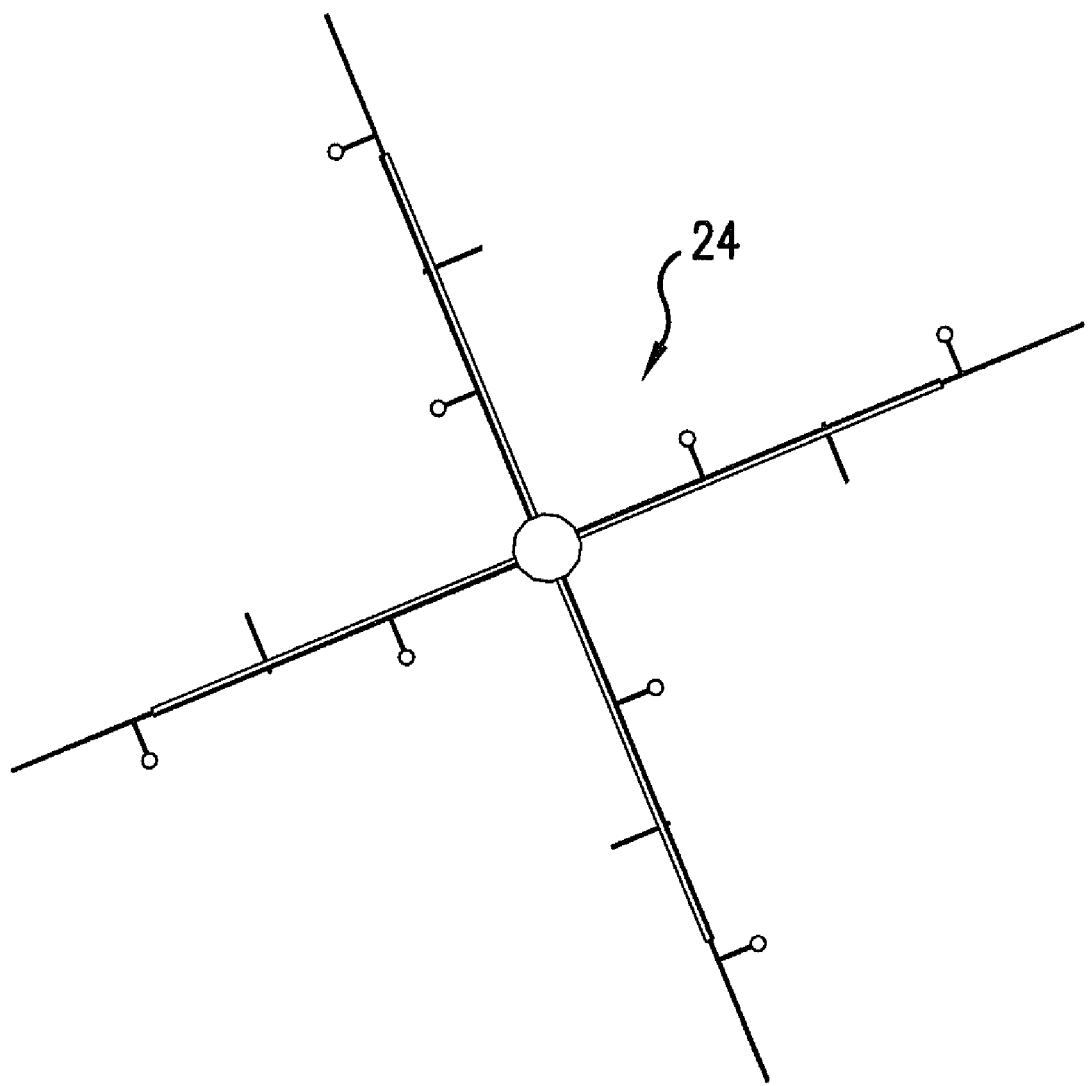
FIG. 20—Top view of one crossbar of the second embodiment of the invention.
Figure 21:
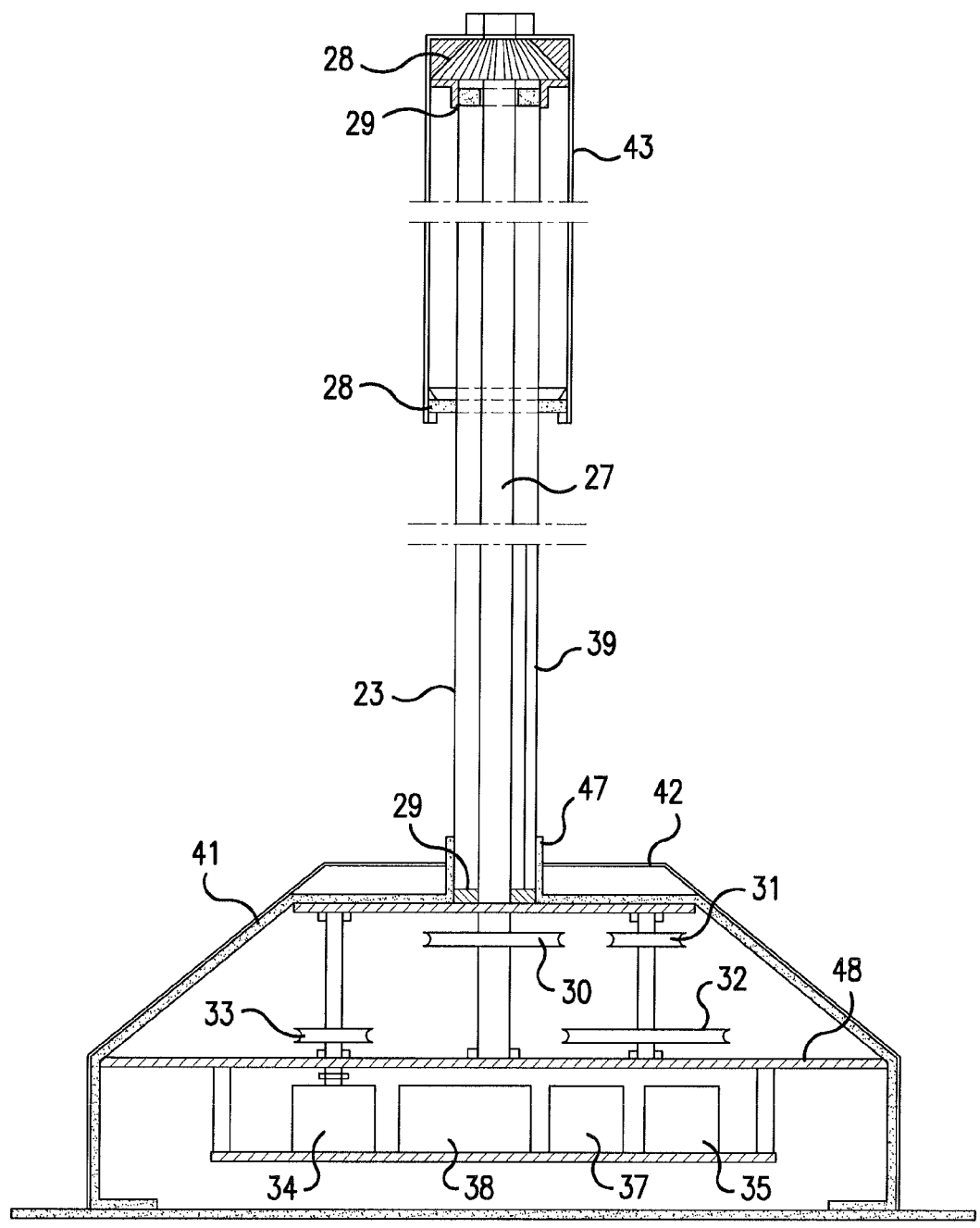
FIG. 21—Sectional cut frontal view of the second embodiment of the invention.

Once installed, the windmill begins to work in the presence of wind, that when beats the panels (2) on the side A (see FIG. 07) the rotational group (43) rotates in the clockwise or counterclockwise sense, depending on the side where the stoppers (46) are installed. The plates on the side B tip almost horizontally (not demonstrated in the figures) providing a wind resistance of approximately 1 to 5% of the value of the wind force. In this way, when the panels that were on the side B arrive to the side A, by virtue of the angle of 10° that these were, the wind pushes them down leaving them in the vertical position impelling the rotational group (43) and so forth.

The rotational group (43) rotates on the bearings and transmits the rotation to the rotational vertical shaft (27), so through the pulleys (30), (31), (32), and (33) it transmits the rotation to the continuous current generator (34) to produce electric power. This energy is then passed to the control circuit (35) that verifies the status of the brightness sensor (36). If the sensor informs that the brightness expressed is low, in other words, it is at night or very cloudy, then the control circuit addresses the electric power to the reactor (37) that elevates the voltage to be transmitted for the lamps (40). Otherwise, the control circuit (35) addresses the electric power to the batteries (38) so as to keep them charged. The control circuit (35) monitors the level of charge of the batteries (38), and when it verifies that these are fully charged, it cuts the supply of energy, avoiding overloads and the premature waste of the batteries (38). In case the sensor indicates that the brightness is low, but the generator is not generating energy because of lack of wind, then the control circuit addresses the energy of the batteries (38) to the reactor (37) that turns on the lamps (40). The generated energy can be used to feed other systems, such as a residences, small communities, etc.

The invention claimed is:

1. A windmill, comprising:
   a vertical rotating shaft supported by bearings on a vertical supporting post,
   horizontal supporting members attached to the vertical rotating shaft,
   panels attached at their upper edge to the horizontal supporting members,
   stoppers or frames disposed so as to maintain the panels in a vertical position when the panels receive wind force on the front of the panel,
   wherein the attachment of the panels to the horizontal supporting members is by a hinge that allows the panels to raise to a nearly horizontal position or to a horizontal position when the panels receive wind force on tile back of the panel and;
   wherein the horizontal supporting members are threaded to form a screw and are attached to a servo motor by which the panels can be moved toward or away from the vertical rotating shaft.

2. The windmill according to claim 1, in which the panels are made of a flexible material and can be rolled up to change the surface area for receiving the wind force.

3. The windmill according to claim 2, in which the horizontal supporting members are arranged as cross-bars that are further arranged in a plane such that the angle between two horizontal supporting members is 90 degrees divided by the number of crossbars.

4. The windmill according to claim 3, in which a plurality of planes of crossbars are attached to the vertical rotating shaft.

5. The windmill according to claim 1, in which the panels are made of stacked foils that can be feathered to change the surface area for receiving the wind force.

6. The windmill according to claim 5, in which the horizontal supporting members are arranged as cross-bars that are further arranged in a plane such that the angle between two horizontal supporting members is 90 degrees divided by the number of crossbars.

7. The windmill according to claim 6, in which a plurality of planes of crossbars are attached to the vertical rotating shaft.

8. The windmill according to claim 1, in which the horizontal supporting members are arranged as cross-bars that are further arranged in a plane such that the angle between two horizontal supporting members is 90 degrees divided by the number of crossbars.

9. The windmill according to claim 8, in which a plurality of planes of crossbars are attached to the vertical rotating shaft.

10. The windmill according to claim 1, that further comprises solenoids attached to the horizontal supporting members that can be energized to maintain the panels in a horizontal position throughout a complete rotation of the vertical rotating shaft.

11. A windmill, comprising:
    a vertical rotating shaft supported by bearings on a vertical supporting post,
    horizontal supporting members attached to the vertical rotating shaft,
    panels attached at their upper edge to the horizontal supporting members,
    means for maintaining the panels in a vertical position when the panels receive wind force on the front of the panel,
    wherein the panels are attached to the horizontal supporting members by means that allow the panels to raise to an approximately horizontal position or to a horizontal position when the panels receive wind force on the back of the panel and;
means for moving the position of the panel along the horizontal supporting member relative to the vertical shaft so as to maintain the rotation rate of the vertical shaft constant upon variation in the wind speed.

12. The windmill of claim 11 that further comprises means for changing the area of the panels that receives the force of wind upon the panels to maintain the rotation of the vertical shaft constant upon variation in the wind speed.

* * * * *